(12) United States Patent
Wang et al.

(10) Patent No.: US 11,997,528 B2
(45) Date of Patent: May 28, 2024

(54) COMMUNICATION METHOD, APPARATUS, ELECTRONIC DEVICE AND COMPUTER READABLE STORAGE MEDIUM

(71) Applicant: Samsung Electronics Co., Ltd., Suwon-si (KR)

(72) Inventors: Weiwei Wang, Beijing (CN); Hong Wang, Beijing (CN); Lixiang Xu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 213 days.

(21) Appl. No.: 17/507,038

(22) Filed: Oct. 21, 2021

(65) Prior Publication Data

US 2022/0124546 A1    Apr. 21, 2022

(30) Foreign Application Priority Data

Oct. 21, 2020 (CN) .......................... 202011135909.X
May 17, 2021 (CN) .......................... 202110536675.8

(51) Int. Cl.
    *H04W 28/06*    (2009.01)
    *H04W 28/02*    (2009.01)
    *H04W 28/04*    (2009.01)

(52) U.S. Cl.
    CPC ....... *H04W 28/0242* (2013.01); *H04W 28/04* (2013.01); *H04W 28/06* (2013.01)

(58) Field of Classification Search
    CPC .. H04W 28/0242; H04W 28/06; H04W 28/04
    See application file for complete search history.

(56) References Cited

U.S. PATENT DOCUMENTS

2020/0100115 A1* 3/2020 Skaaksrud .............. H04L 67/04
2021/0127293 A1   4/2021 Hong
(Continued)

FOREIGN PATENT DOCUMENTS

EP          3 927 009 A1    12/2021
KR    10-2020-0013576 A      2/2020
(Continued)

OTHER PUBLICATIONS

Qualcomm (Moderator), Summary of Offline Discussion on IAB service interruption, R3-205467, 3GPP TSG RAN WG3 # 109-e, Sep. 2, 2020, Online.
(Continued)

*Primary Examiner* — Syed Ali
(74) *Attorney, Agent, or Firm* — Jefferson IP Law, LLP

(57) ABSTRACT

The disclosure relates to a pre-5th generation (5G) or 5G communication system to be provided for supporting higher data rates beyond 4th generation (4G) communication system such as long term evolution (LTE). a communication method, apparatus, electronic device, and computer-readable storage medium, and relate to the field of wireless communication technology are provided. The method may be executed by the first node, and may include receiving a first message transmitted by a second node, wherein the first message is used by the first node to configure transmission and/or storage of a user data packet. Based on the solution provided by the embodiments of the disclosure, it may effectively improve one or more of the following problems: data packet loss, network resource waste, transmission failure and the like that may be caused by the migration of relay nodes in the network.

15 Claims, 19 Drawing Sheets

(56) References Cited

U.S. PATENT DOCUMENTS

| | | | |
|---|---|---|---|
| 2022/0132381 A1* | 4/2022 | Novlan | H04W 36/0016 |
| 2022/0182903 A1* | 6/2022 | Ishii | H04W 36/00837 |
| 2022/0217598 A1* | 7/2022 | Ishii | H04W 36/0058 |
| 2023/0071471 A1* | 3/2023 | Park | H04B 7/0617 |
| 2023/0098159 A1* | 3/2023 | Liu | H04W 36/0005 |
| | | | 370/331 |

FOREIGN PATENT DOCUMENTS

| | | | | |
|---|---|---|---|---|
| WO | 2017/004253 A1 | 1/2017 | | |
| WO | WO-2018119123 A1 * | 6/2018 | | H04W 28/0263 |
| WO | 2020/164569 A1 | 8/2020 | | |

OTHER PUBLICATIONS

Huawei, Summary of CB: # 12_IAB_migration_same_donor, R3-203974, 3GPP TSG RAN WG3 # 108-e, Jun. 10, 2020, Online.

Huawei, Inter-donor-CU handover procedure analysis, R3-205292, 3GPP TSG RAN WG3 # 109-e, Aug. 7, 2020, Online.

Ericsson (Moderator), Summary of Offline Discussion on Inter-donor Migration, R3-205466, 3GPP TSG RAN WG3 # 109-e, Sep. 2, 2020, Online.

International Search Report dated Jan. 24, 2022, issued in International Application No. PCT/KR2021/014803.

Extended European Search Report dated Mar. 6, 2024, issued in European Patent Application No. 21883280.6.

* cited by examiner

COMMUNICATION METHOD, APPARATUS, ELECTRONIC DEVICE AND COMPUTER READABLE STORAGE MEDIUM

CROSS-REFERENCE TO RELATED APPLICATION(S)

This application is based on and claims priority under 35 U.S.C. § 119(a) of a Chinese patent application number 202011135909.X, filed on Oct. 21, 2020, in the Chinese Intellectual Property Office, and of a Chinese patent application number 202110536675.8, filed on May 17, 2021, in the Chinese Intellectual Property Office, the disclosure of each of which is incorporated by reference herein in its entirety.

BACKGROUND

1. Field

The disclosure relates to a field of wireless communication technology. More particularly, the disclosure relates to a communication method, apparatus, electronic device, and computer-readable storage medium.

2. Description of Related Art

In order to meet an increasing demand for wireless data communication services since a deployment of $4^{th}$ generation (4G) communication system, efforts have been made to develop an improved $5^{th}$ generation (5G) or pre-5G communication system. Therefore, the 5G or pre-5G communication system is also called "beyond 4G network" or "post long-term evolution (LTE) system".

The 5G communication system is considered to be implemented in higher frequency (millimeter (mm) Wave) bands, e.g., 60 gigahertz (GHz) bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Wireless communication is one of the most successful innovations in modern history. Recently, a number of subscribers of wireless communication services has exceeded 5 billion, and it continues growing rapidly. With the increasing popularity of smart phones and other mobile data devices (such as tablet computers, notebook computers, netbooks, e-book readers and machine-type devices) in consumers and enterprises, a demand for wireless data services is growing rapidly. In order to meet rapid growth of mobile data services and support new applications and deployments, it is very important to improve efficiency and coverage of wireless interfaces.

The above information is presented as background information only to assist with an understanding of the disclosure. No determination has been made, and no assertion is made, as to whether any of the above might be applicable as prior art with regard to the disclosure

SUMMARY

Aspects of the disclosure are to address at least the above-mentioned problems and/or disadvantages and to provide at least the advantages described below. Accordingly, an aspect of the disclosure is to provide a communication method, apparatus, electronic device, and computer-readable storage medium.

Additional aspects will be set forth in part in the description which follows and, in part, will be apparent from the description, or may be learned by practice of the presented embodiments.

In accordance with an aspect of the disclosure, a communication method executed by a first node is provided. The communication method includes receiving a first message transmitted by a second node, wherein the first message is used by the first node to configure transmission and/or storage of a user data packet.

In accordance with another aspect of the disclosure, a communication method executed by a second node is provided. The communication method includes transmitting a first message, wherein the first message is used by a first node to configure transmission and/or storage of a user data packet.

In accordance with another aspect of the disclosure, a communication method executed by a first node is provided. The communication method includes receiving a third message, wherein the third message is used by the first node to configure transmission of a user data packet, and transmitting the user data packet according to the third message.

In accordance with another aspect of the disclosure, a communication method executed by a second node is provided. The communication method includes transmitting a third message, wherein the third message is used by the first node to configure transmission of a user data packet.

In accordance with another aspect of the disclosure, a communication method executed by a third node is provided. The communication method includes transmitting a fourth message, wherein the fourth message indicates timing of updating and/or releasing configuration by a fourth node.

In accordance with another aspect of the disclosure, a communication method executed by a fourth node is provided. The communication method includes receiving a fourth message transmitted by a third node, wherein the fourth message indicates timing of updating and/or releasing configuration by the fourth node.

In accordance with another aspect of the disclosure, a communication method executed by a sixth node is provided. The communication method includes transmitting a fifth message, wherein the fifth message includes configuration information about transmitting and/or processing of a data packet by a user terminal accessing a seventh node, and wherein the transmission configuration information includes configuration information corresponding to a migrated relay node before being migrated, and/or configuration information corresponding to the migrated relay node after being migrated.

In accordance with another aspect of the disclosure, a communication method executed by a user terminal is provided. The communication method includes receiving a fifth message, wherein the fifth message includes configuration information about transmitting and/or processing of a data packet by a user terminal accessing a seventh node, and wherein the transmission configuration information includes configuration information corresponding to a migrated relay node before being migrated, and/or configuration information corresponding to the migrated relay node after being migrated.

Corresponding to the methods provided in the embodiments of the disclosure, embodiments of the disclosure also provide a corresponding communication apparatus, and the communication apparatus includes a communication module.

Where, according to an aspect of the disclosure, the communication module may be configured to receive a first message transmitted by a second node, wherein the first message is used by the first node to configure transmission and/or storage of a user data packet.

According to another aspect of the disclosure, the communication module is configured to transmit a first message, wherein the first message is used by the first node to configure transmission and/or storage of a user data packet.

According to still another aspect of the disclosure, the communication module is configured to receive a third message, and transmit a user data packet according to the third message, wherein the third message is used to configure transmission of a user data packet corresponding to a first node.

According to yet another aspect of the disclosure, the communication module is configured to transmit a third message, wherein the third message is used to configure transmission of a user data packet corresponding to a first node.

According to another aspect of the disclosure, the communication module is configured to transmit a fourth message, wherein the fourth message is used to indicate timing of updating and/or releasing by a fourth node.

According to still another aspect of the disclosure, the communication module is configured to receive a fourth message transmitted by the third node, wherein the fourth message indicates timing of updating and/or releasing configuration by a fourth node.

According to yet another aspect of the disclosure, the communication module is configured to transmit a fifth message, the fifth message includes configuration information about transmitting and/or processing of a data packet by a user terminal accessing a seventh node, wherein the transmission configuration information includes configuration information corresponding to a migrated relay node before being migrated, and/or the configuration information corresponding to the migrated relay node after being migrated.

According to yet another aspect of the disclosure, the communication module is configured to receive a fifth message, and transmit and/or process a data packet based on the fifth message, the fifth message includes configuration information about transmitting and/or processing of the data packet by a user terminal accessing a seventh node, wherein the transmission configuration information includes configuration information corresponding to a migrated relay node before being migrated, and/or configuration information corresponding to the migrated relay node after being migrated.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
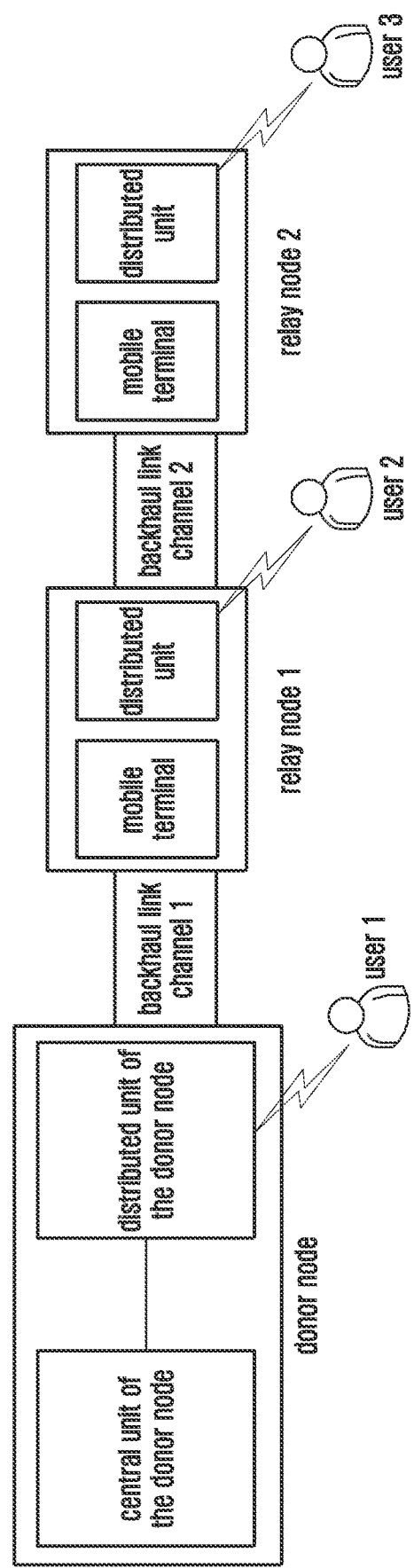
FIG. 1 is an example of a relay network according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Those skilled in the art should understand that the singular forms "a", "an", "said" and "the" include plural from unless the context clearly dictates otherwise. It should be further understood that the expression "include" used in the specification of the disclosure means the presence of the feature, integer, step, operation, element and/or component, but does not preclude the presence or addition of one or more other features, integers, steps, operations, elements, components and/or combinations thereof. It should be understood when an element is referred to as being "connected to" or "coupled to" another element, it may be directly connected or coupled to the other element, or an intervening element may be present. Furthermore, the terms "connected" or "coupled" used herein may include a wireless connection or a wireless coupling. The phrase "and/or" used herein includes all or any one and all combinations of one or more of the associated listed items.

Those skilled in the art may understand that, unless otherwise defined, all terms (including technical terms and scientific terms) used herein have the same meaning as those commonly understood by those of ordinary skill in the art to which the disclosure belongs. It should also be understood that terms such as those defined in general dictionaries should be understood to have a meaning consistent with the meaning in the context of the prior art, and unless specifically defined as here, otherwise, it will not be interpreted in an idealized or overly formal meaning.

Those skilled in the art may understand that the "terminal" and "terminal equipment" used herein include both wireless signal receiver equipment, which only has an equipment with wireless signal receivers without transmitting capability, and also includes receiving and transmitting hardware equipment which has an equipment capable of receiving and transmitting hardware for two-way communication on a two-way communication link. Such equipment may include: cellular or other communication equipment, which has a single-line display or multi-line display or cellular or other communication equipment without a multi-line display; Personal Communications Service (PCS), which may combine voice and data processing, fax and/or data communication capabilities; Personal Digital Assistant (PDA), which may include radio frequency receivers, pagers, Internet/Intranet access, web browsers, notepads, calendars and/or Global Positioning System (GPS) receiver; a conventional laptop and/or palmtop computer or other device that has and/or includes a radio frequency receiver. The "terminal" and "terminal equipment" used here may be portable, transportable, installed in vehicles (aviation, sea and/or land), or suitable and/or configured to operate locally, and/or in a distributed form, it operates on the earth and/or any other location in space. The "terminal" and "terminal device" used here may also be communication terminals, internet terminals, music/video playback terminals, for example, PDAs, Mobile Internet Devices (MIDs) and/or mobile phones with music/video playback function, and may also be devices such as smart televisions (TVs) and set-top boxes.

In order to make the purpose, technical solutions, and advantages of the disclosure clearer, the implementation of the disclosure will be further described in detail below in conjunction with the accompanying drawings. The following optional embodiments provided in the disclosure may be implemented individually or in combination with each other. The same or similar concepts or processes may not be repeated in some embodiments.

FIG. 1 is an example of a relay network according to an embodiment of the disclosure.

In the New Radio (NR) access network, in order to expand the coverage of the network, a relay network architecture is proposed, that is, the Integrated Access and Backhaul (IAB) network. FIG. 1 shows a schematic architecture of a multi-hop relay network (IAB network). The figure shows a network architecture containing a donor node (for example, IAB donor/anchor) and two relay nodes (for example, IAB node). The donor node may be an independent base station, or a base station composed of a central unit CU (IAB-donor central unit) and a distributed unit DU (IAB-donor distributed unit). The Relay node (relay node 1 and relay node 2 as shown in the figure) includes a mobile terminal function and a distributed terminal function. Where, the mobile terminal function and the distributed terminal function of the relay node may also be described as a mobile terminal function part (the mobile terminal described in FIG. 1) and a distributed unit function part (the distributed unit shown in FIG. 1).

Referring to FIG. 1, the user (i.e., user equipment/user terminal/terminal equipment) in the multi-hop relay network may access the network through a donor node or a donor node's distributed unit or a relay node, for example, user 1/2/3 respectively access the relay network through the distributed unit of the donor node, the distributed unit of the relay node 1, and the distributed unit of the relay node 2. The mobile terminal function part of the relay node is used to communicate with the upper level node of the relay node (for example, the mobile terminal of the relay node 1 is used to communicate with the donor node or the distributed unit of the donor node, and the mobile terminal of the relay node 2 is used to communicate with the distributed unit of the relay node 1), and the distributed unit function part is used to communicate with the lower level node of the relay node (for example, the distributed unit of the relay node 1 is used to communicate with the user 2, and it may also be used to communicate with the mobile terminal of the relay node 2).

In the multi-hop relay network shown in FIG. 1, the link between the distributed unit of the relay node 1 and the mobile terminal of the relay node 2 will be used to transmit data of the user 3, and the link between the distributed unit of the donor node and the mobile terminal of the relay node 1 will be used to transmit data of the user 2 and the user 3. Such links have a common feature, that is, the users served by the link access the network through another distributed unit. Such links may be called a backhaul link, for example, a backhaul link channel 1 and a backhaul link channel 2 shown in FIG. 1.

The mobile terminal of the relay node may be regarded as a user that accesses the network, so it has the function of an ordinary user (non-relay node) (for example, the mobile terminal may establish an Signaling Radio Bearer (SRB) with its upper level node), to transmit a Radio Resource Control (RRC) message, and may also establish a Data Radio Bearer (DRB) to transmit data.

The central unit of the donor node includes protocol stacks: the protocol stack of the service control plane includes a radio resource control (RRC) protocol layer and a Packet Data Convergence Protocol (PDCP) layer, and the protocol stack of the service user plane includes an Service Data Adaptation Protocol (SDAP) layer and a PDCP layer. The distributed unit of the donor node or the distributed unit of the relay node include the protocol stacks: the protocol stacks of the service control plane and the user plane include a radio link control (RLC) protocol layer, and a medium access control (MAC) protocol layer, and a physical layer (PHY). The interface between the central unit of the donor node and the distributed unit of the donor node, and the interface between the central unit of the donor node and the distributed unit of the relay node is an F1 interface (see 3GPP TS38.473).

In the relay network, the relay node may migrate, that is, the upper-level node to which it is connected may change. After the migration is completed, it may continue to transmit user data. However, during the migration process, the communication between the node and a source donor node (the corresponding donor node before migration) is interrupted, and after the migration process is completed, communication with a target donor node (the corresponding donor node after migration) is performed. However, this process will cause the loss of user data, and also cause repeated transmission of user data, which reduces the efficiency of the relay network. It may be seen that the existing communication scheme still needs to be improved.

In order to better understand and explain the various optional implementation solutions provided by the disclosure, the solutions of the disclosure will be described below in conjunction with an optional communication network architecture applicable to the disclosure. Those skilled in the art may understand that the network architecture and the structure of each network device in the network architecture given below in the disclosure are all schematic structures to which the solutions provided in the disclosure may be applied. For the description of these structures, it is only for the convenience of understanding and explaining the optional embodiments of the disclosure, and should not constitute a limitation to the various embodiments of the disclosure, and should not be construed as the limitation of the scope of the disclosure in any way. The principles of the optional embodiments of the disclosure may be implemented in any suitably arranged system or device.

Figure 2:
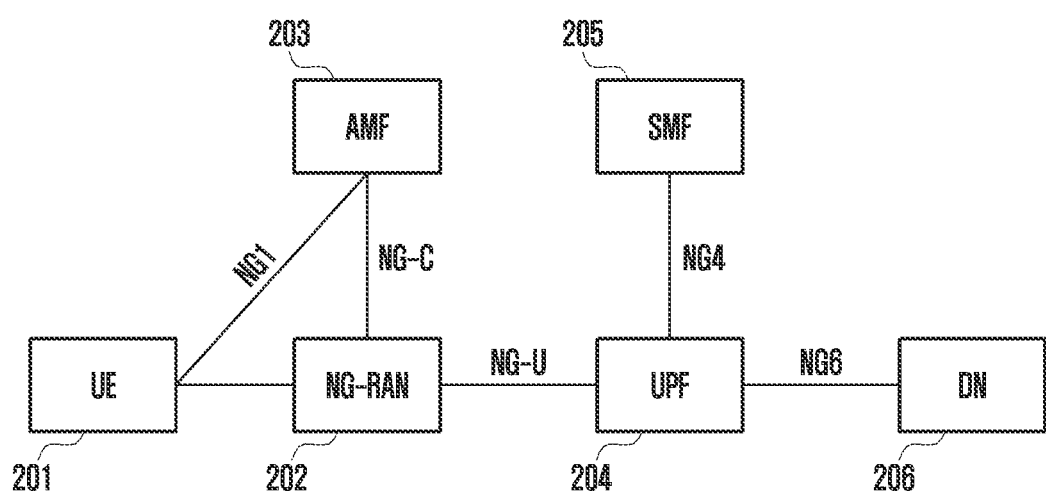
FIG. 2 is an example of a system architecture according to an embodiment of the disclosure.

FIG. 2 is an example of a system architecture to which the method provided in the according to an embodiment of the disclosure.

As an example, FIG. 2 shows a schematic diagram of a network architecture applicable to the disclosure. As shown in the figure, a user equipment (UE, User Equipment, user terminal) 201 is a terminal device used to receive/transmit data. Next Generation Radio Access Network (NG-RAN) 202 is a radio access network, which includes a base station (gNB or eNB connected to a 5G core network (5GC, $5^{th}$ generation core), the eNB connected to 5GC (which is also called ng-gNB)) which provides the UE with the radio network interface. An access control and mobility management function (AMF, Access and Mobility Management) entity 203 is responsible for managing the mobility context and security information of the UE. A user plane function (UPF) entity 204 mainly provides a user plane function. A Session Management Function (SMF) entity 205 is responsible for session management. A data network (DN) 206 includes, for example, operator services, Internet access, and third-party services and the like.

Figure 3A:
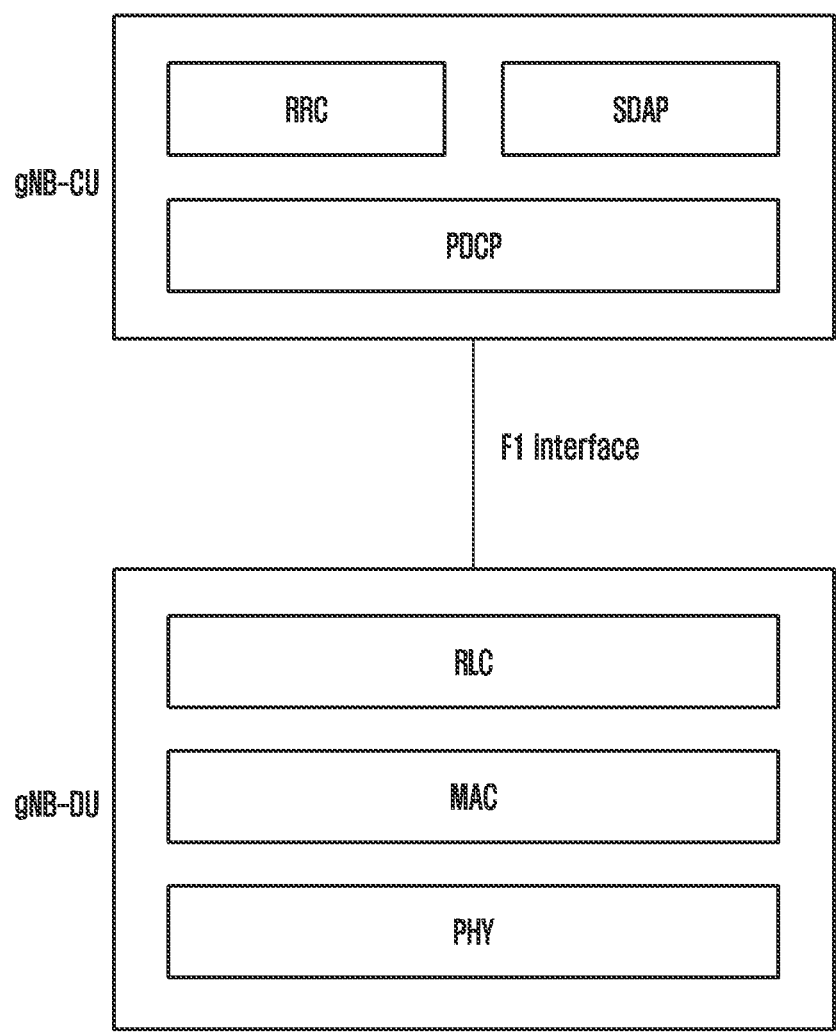
FIG. 3A is an example of a base station structure according to various embodiments of the disclosure.
Figure 3B:
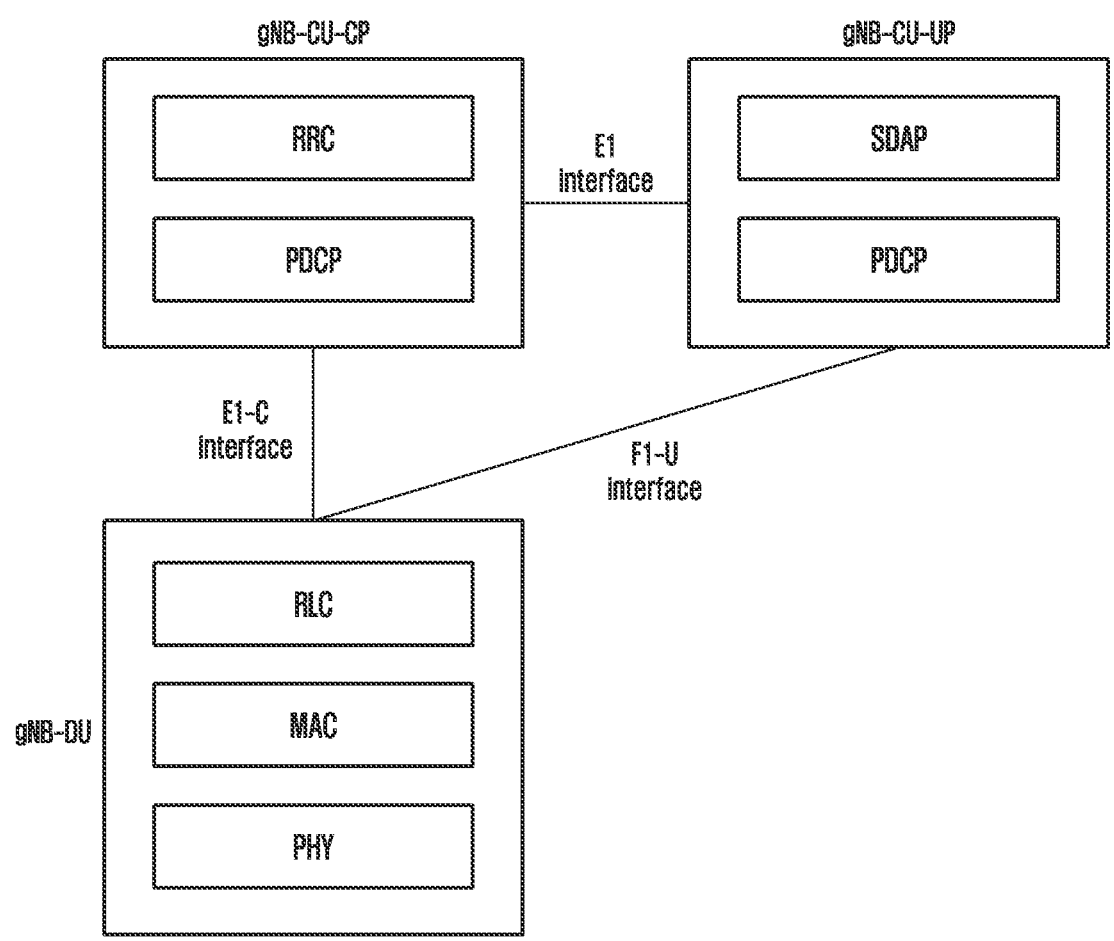
FIG. 3B is an example of a base station structure according to various embodiments of the disclosure.

FIGS. 3A and 3B are examples of a base station structure according to various embodiments of the disclosure.

In the New Radio (NR) system, in order to support network function virtualization, more efficient resource management and scheduling, the base station (gNB) that provides the UE with the wireless network interface may be further classified into a central unit gNB-CU (gNB central unit) and a distributed unit gNB-DU (gNB distributed unit) (referred to as CU and DU in the embodiment of the disclosure), referring to FIG. 3A. The CU has a radio resource control (RRC), a service data adaptation protocol (SDAP), and a packet data convergence protocol (PDCP) protocol layer. The DU has a radio link control protocol (RLC), a medium access control (MAC) and a physical layer (PHY). There is a standardized public interface F1 between the CU and the DU. The F1 interface is classified into a control plane F1-C interface and a user plane F1-U interface. A transmission network layer of the F1-C interface is transmitted based on Internet Protocol (IP). In order to transmit signaling more reliably, Stream Control Transmission Protocol (SCTP) protocol is added on top of IP. The protocol of the application layer is F1AP (F1 Application Protocol), you may refer to the standard 3GPP TS38.473. The SCTP may provide a reliable application layer message transmission. The protocol on which the transport layer of the F1-U interface is based is UDP (User Datagram Protocol, which is used for data protocol)/IP, GTP-U (General packet radio service Tunnel Protocol User) is above UDP/IP, which is used to carry User Plane Protocol Data Unit (PDU).

Further, referring to FIG. 3B, gNB-CU may include gNB-CU-CP (a control plane part of the central unit of the base station) and gNB-CU-UP (a user plane part of the central unit of the base station). The gNB-CU-CP contains the control plane function of the base station, which has RRC and PDCP protocol layers, and the gNB-CU-UP contains the user plane function of the base station, which has SDAP and PDCP protocol layers. There is a standardized public interface E1 between the gNB-CU-CP and the gNB-CU-UP, the protocol is E1AP (E1 Application Protocol), you may refer to the standard 3GPP TS38.463. The interface between the control plane part of the central unit of the base station and the distributed unit of the base station is the F1-C interface, that is, the control plane interface of F1, and the interface between the user plane part of the central unit of the base station and the distributed unit of the base station is the F1-U interface, that is, the user interface of F1.

In a multi-hop relay network, the UE may access the network through a base station (donor node), a distributed unit of the base station, or a relay node (for example, the distributed unit of a relay node). When the UE accesses the network through a relay node, the relay node may migrate, that is, the upper-level node to which it is connected may change. However, during the migration process, how to maintain the transmission of user data is an urgent problem to be solved. The purpose of the disclosure is to solve at least one of the problems: user data loss and user data retransmission that may exist in the process of relay node migration, so as to avoid or reduce user data loss and repeated transmission.

For each optional embodiment of the disclosure, it should be noted that the names of various messages, various indication information, and various configuration information mentioned in each optional embodiment of the disclosure are only schematic names, not unique, and the name of other messages or information may also be used. Similarly, the "first", "second" etc. recorded in the description of each message and/or each information are only used to distinguish the message and/or information, and do not constitute other limitations on the information and/or message. Limitations such as "first" and "second" described in the disclosure are not limitation on the order of execution.

In addition, it may be understood by those skilled in the art that, in actual implementation, the solutions provided by the optional embodiments of the disclosure may also include other described communication steps. In the description of the optional embodiments of the disclosure, it is possible to omit some other steps, or omit detailed descriptions of some steps, and the omitted content is clear to those skilled in the art. The solutions based on the embodiments of the disclosure are conceivable implementation steps or specific implementation manners of the steps.

The "uplink" in the embodiments of the disclosure refers to the direction of data from the UE to the network device, such as the direction from the UE to the relay node, the direction from the relay node to the donor node, for example, the relay node transmits a data packet to the donor node (or the central unit of the donor node, or the control plane part of the central unit of the donor node, or the user plane part of the central unit of the donor node), and the data packet may be called an uplink data packet. Correspondingly, "downlink" refers to the direction from the network device to the UE. For example, the donor node transmits data to the relay node, and the relay node transmits data to its lower-level node, and the relay node transmits data to the UE. For example, the donor node (or the central unit of the donor node, or the control plane part of the central unit of the donor node, or the user plane part of the central unit of the donor node) transmits a data packet to the relay node, and the data packet may be called a downlink data packet.

Taking the relay network shown in FIG. 1 as an example, the relay node 2 transmits data to the relay node 1, the relay node 1 transmits data to the donor node, and the user transmits data to the corresponding network access node (for example, the user 1 accesses the distributed unit of the donor node and the user 2 accesses the distributed unit of relay node 1), which belongs to the uplink data. The donor node, the relay node 1 and the relay node 2 transmits data to the corresponding users, the donor node transmits data (which belongs to the downlink data) to the relay node 1, and the relay node 1 transmits data (which belongs to the downlink data) to the relay node 2, which belongs to the downlink data.

In addition, the descriptions of "child nodes" and "parent nodes" described in the embodiments of the disclosure are described based on "uplink". The network structure shown in FIG. 1 is still taken as an example. The donor node (or the distributed unit of the donor node, or the central unit of the donor node, or the control plane part of the central unit of the donor node, or the user plane part of the central unit of the donor node) is the parent node of the relay node 1 (or the mobile terminal of the relay node 1, or the distributed unit of the relay node 1), and the relay node 2 (or the mobile terminal of the relay node, 2 or the distributed unit of relay node 2) is the child node of the relay node 1 (or the mobile terminal of the relay node 1, or the distributed unit of relay node 1). It is understandable that this description method is not unique. For example, it may also be described based on "downlink". In this case, the relay node 2 may be considered as the parent node of the relay node 1.

It may be understood that, for any relay node, the relay node may have both a child node and a parent node, such as relay node 1 in FIG. 1. The parent node of the node is an donor node, and the child node of the node is the relay node 2, and some relay nodes may also have only a parent node, such as the relay node 2 in FIG. 1, which has only a parent node, that is, the relay node 1.

In the embodiment of the disclosure, the migration of a relay node refers to a change in the parent node of the relay node. The parent node of a relay node may be a donor node or another relay node.

Figure 4A:
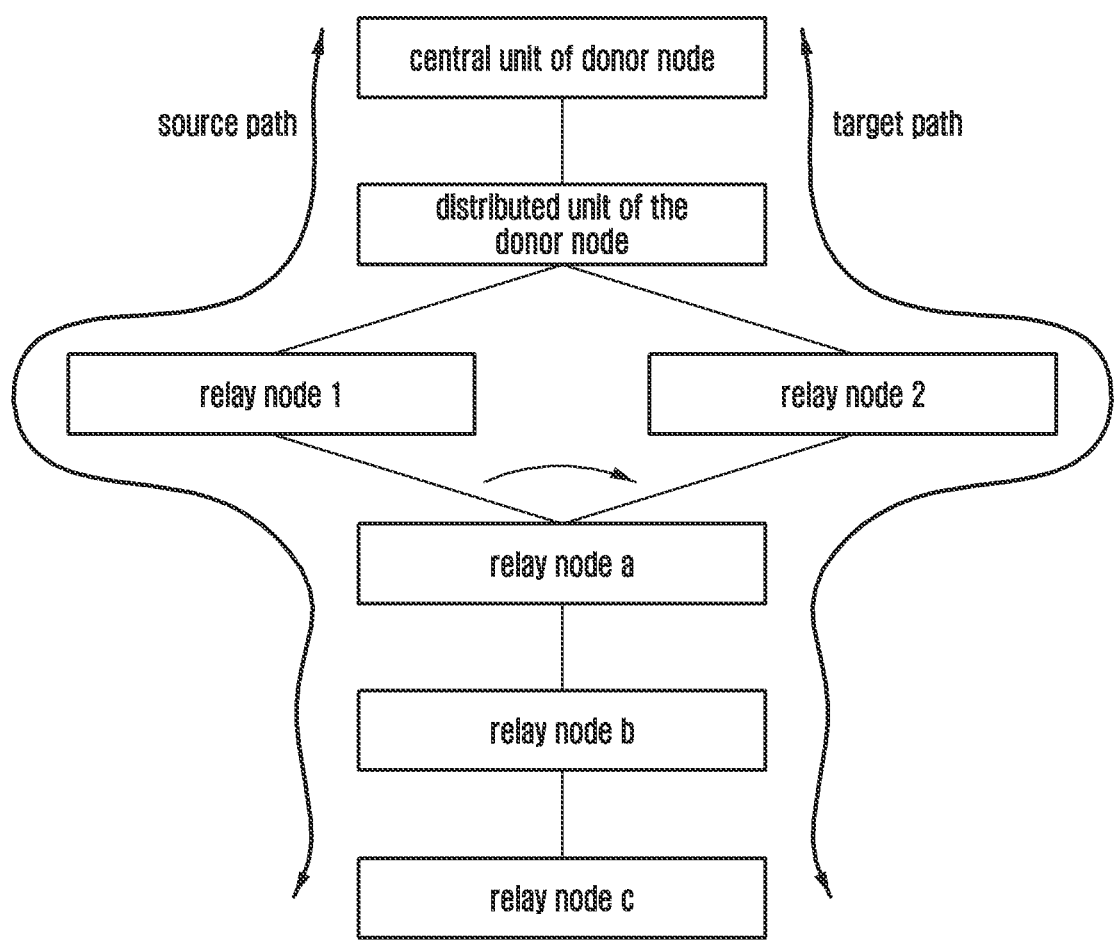
FIG. 4A is an example of migrations of three types of relay nodes according to various embodiments of the disclosure.
Figure 4B:
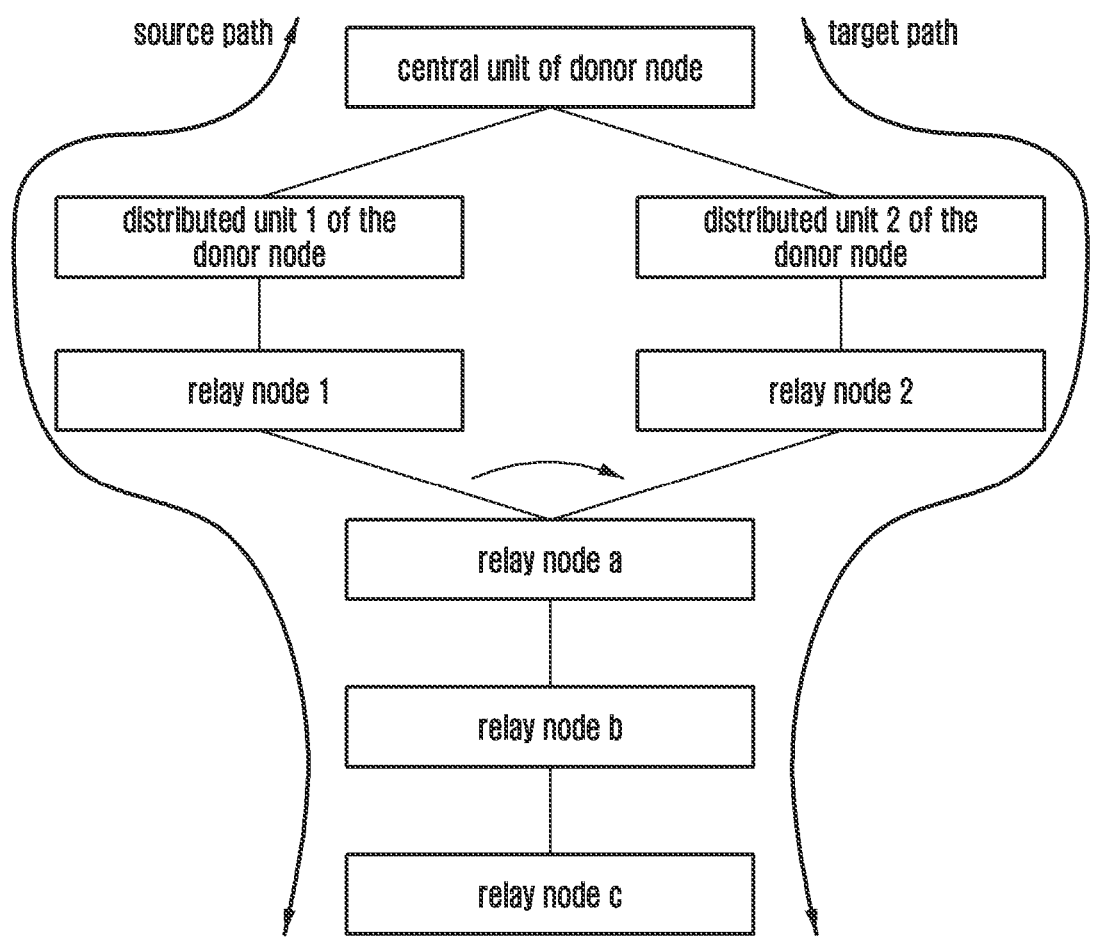
FIG. 4B is an example of migrations of three types of relay nodes according to various embodiments of the disclosure.
Figure 4C:
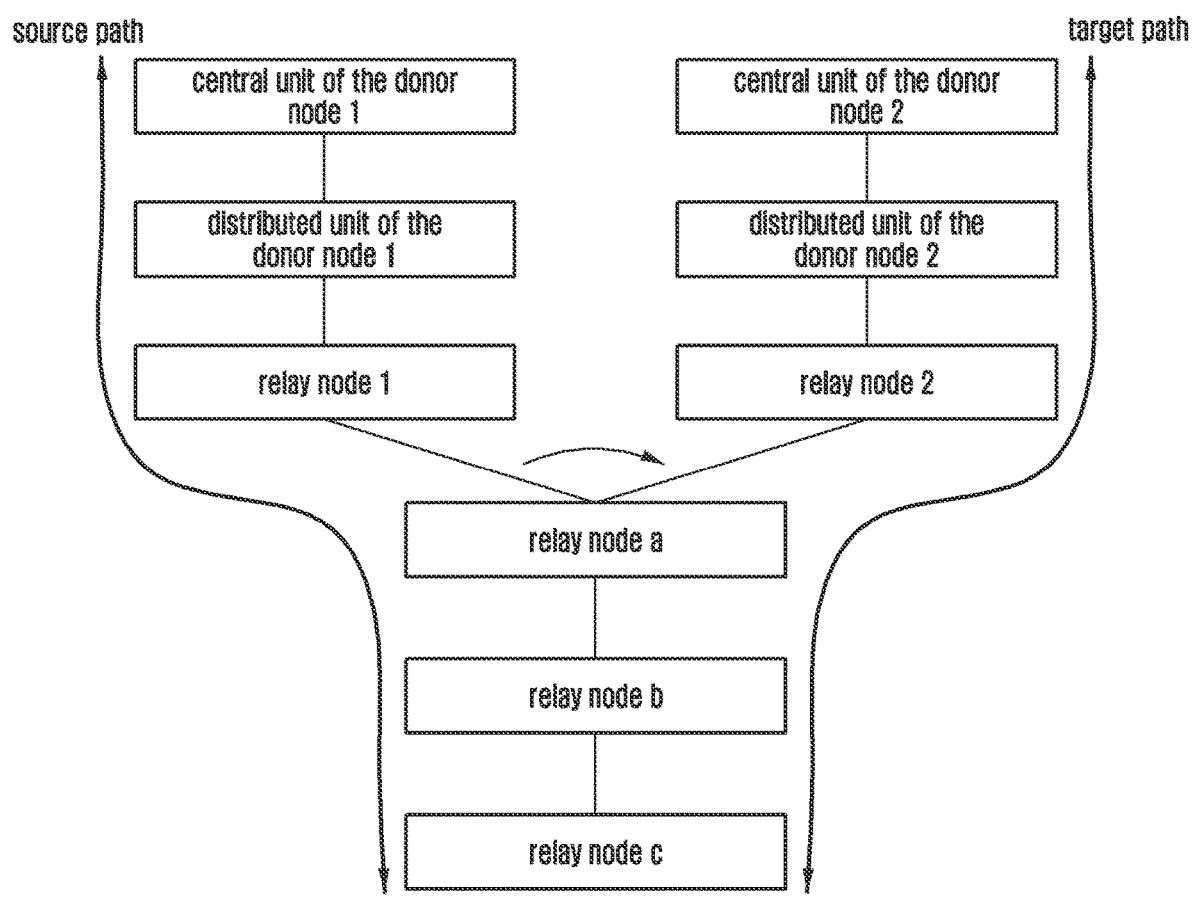
FIG. 4C is an example of migrations of three types of relay nodes according to various embodiments of the disclosure.

FIGS. 4A, 4B, and 4C are examples of migrations of three types of relay nodes according to various embodiments of the disclosure.

In the embodiments of the disclosure, data transmission (i.e., data packet transmission) during the migration process of the relay node is considered. For the scenario where the relay node is migrated, the possible migration includes three cases. The three cases are illustrated in conjunction with the schematic network structure referring to FIGS. 4A, 4B, and 4C, wherein the curve on the left of FIGS. 4A, 4B, and 4C represents the data transmission path before migration, the curve on the right represents the data transmission path after migration, and the one-way arrow in the figure represents the migration of the relay node a, that is, the relay node a is the migrated relay node, the relay node 1 is the parent node of the relay node a before the migration, and the relay node 2 is the parent node of the relay node a after migration.

The first case: Intra-donor-CU (internal of the central unit of the donor node)/intra-donor-DU (internal of the distributed unit of the donor node) migration, wherein the internal migration means that the donor node's central unit/distributed unit remain unchanged: as shown in FIG. 4A, when the relay node a migrates, the central unit of the donor node and the distributed unit of the donor node to which it is connected remain unchanged.

The second case: Intra-donor-CU/inter-donor-DU (external of the distributed unit of the donor node) migration, wherein the external migration refers to a change: referring to FIG. 4B, when the relay node a migrates, the central unit of the connected donor node remains unchanged, but the distributed unit of the connected donor node has changed. Referring to FIG. 4B, the distributed unit of the donor node connected to the relay node a before migration is a distributed unit 1 of the donor node, and the distributed unit of the donor node connected after the migration is the distributed unit 2 of the donor node.

The third case: Inter-donor-CU (external of the central unit of the donor node) migration, the migration means that the entire donor node has changed: referring to FIG. 4C, when the relay node a migrates, the central unit of the connected node and the distributed unit of the donor node have changed. Referring to FIG. 4C, the central unit of the donor node connected to the relay node a before migration is the central unit of the donor node 1, and the distributed unit of the donor node connected to the relay node a before migration is the distributed unit of the donor node 1, the central unit of the donor node connected to the relay node a after migration is the central unit of the donor node 2, and the distributed unit of the connected donor node is the distributed unit of the donor node 2.

In the above migration process, other nodes (the relay node b and the relay node c) that access the relay node a may also migrate with it. In addition, before the relay node migration, the transmission path of user data (that is, user data packet) is the source path, and after the relay node migration, the transmission path of the user data is the target path. In actual situations, the source path and the target path may have the same node. For example, in the path to the relay node b, the relay node a is in both the source path and the target path.

In order to facilitate the description and understanding of the embodiments, the following first describes the technical terms that may be involved in each optional embodiment below.

The migrated node: This node refers to a relay node whose parent node connected in the network has changed (for example, it is called node A, that is, the parent node of the node A has changed), or refers to the node whose connection relationship in the network has changed due to the connection change of the node A, for example, the child node of the node A or the child node of the child node of the node A.

The first node: this node may be a relay node, or a function part of a distributed unit of a relay node, or a mobile terminal functional part of a relay node, or a distributed unit of a donor node (which may be the donor node connected before the configuration update or before the migration of the migrated node, or may be the donor node connected after the configuration update or after the migration of the migrated node). In an embodiment, the node may be a migrated node, that is, the parent node to which the node is connected has changed, for example, the relay node a in FIGS. 4A, 4B, and 4C. In another embodiment, the node may be a child node of the migrated relay node, the node is connected to the network through the migrated relay node, and the node is directly or indirectly connected to the migrated relay node (indirect connection refers to the connection of one or more nodes to the migrated relay node), for example, the relay nodes b and c referring to FIGS. 4A, 4B and 4C, the relay node b is directly connected to the relay node a, and the relay node c is indirectly connected to relay node a; in another embodiment, the node may be the parent node directly connected or indirectly connected to the migrated relay node (indirect connection refers to connection via the parent node connected by one or more nodes), such as the relay nodes 1 and 2 in FIGS. 4A, 4B, and 4Cc.

The second node: this node is the donor node, or the central unit of the donor node, or the control plane part of the central unit of the donor node, or the user plane part of the central unit of the donor node. When the relay node migrates, the second node may be the node connected before migration, or the node connected after migration, that is, the second node may be the donor node, or the central unit of the donor node, or the control plane part of the central unit of the donor node, or the user plane part of the central unit of the donor node connected to the migrated relay node before migration (that is, the donor node on the source path or the component part of the donor on the source path), or may be the donor node, or the central unit of the donor node, or the control plane part of the central unit of the donor node, or the user plane part of the central unit of the donor node connected to the migrated relay node after migration, (that is, the donor node on the target path or the component part of the donor node on the target path).

The second node a: this node is the donor node, or the central unit of the donor node, or the control plane part of the central unit of the donor node, or the user plane part of the central unit of the donor node. When the relay node migrates, the second node a is the donor node connected after migration, such as the donor node 2 in FIG. 4c, or the central unit of the donor node 2, or the control plane part of the central unit of the donor node 2, or the user plane part of the central unit of the donor node 2.

The first node a: this node is a child node of the migrated relay node, such as the relay node b or c in FIGS. 4A, 4B, and 4C. The node may be a relay node, or may be a distributed unit function part of a relay node, or may be a mobile terminal function part of a relay node. The node accesses to the network through the migrated relay node, and the node is directly connected or indirectly connected to the migrated relay node (indirect connection refers to the connection to the migrated relay node through one or more nodes).

The first node b: the parent node directly connected or indirectly connected to the migrated relay node (indirect connection refers to the parent node connected through one or more nodes), for example, the relay node 1 or 2 referring to FIGS. 4A, 4B, and 4C. The node may be a relay node, or may be a distributed unit function part of the relay node, or may be a mobile terminal function part of the relay node.

The third node: this node is the migrated relay node, or the child node of the migrated node, or the parent node of the migrated node. The fourth node is the target receiving node (which may also be called as a destination receiving node) of the user data packet corresponding to the third node. Certainly, it may also be the distributed unit function part of the node or may be the mobile terminal function part of the node. As an example, the third node may be a migrated node.

The fourth node: this node is the target receiving node of the user data packet corresponding to the third node. The fourth node may be the target receiving node of the data packet stored or cached by the third node (the data packet cached due to migration). When a node migrates in the network, some user data packets may not be able to be transmitted to the target receiving node before migration, such as the data packet cached (stored) in the above third node, and the target receiving node corresponding to these data packets is the fourth node. As an example, the fourth node may be a child node of the migrated node.

The fifth node: this node may be the fourth node, or may be other nodes on the transmission path of the third node and the fourth node.

It should also be noted that the "node" involved in the embodiments of the disclosure may be a relay node, or a distributed unit function part of a relay node, or may be a mobile terminal function part of a relay node, or may be an donor node, a central unit of the donor node, a control plane part of the central unit of the donor node, or the user plane part of the central unit of the donor node, or may be the user terminal. In some application scenarios or the future communication development, the user terminal may also be a node in the network.

In addition, the transmission in the embodiment of the disclosure may include transmitting and/or receiving, and the "connection" involved in the description of the embodiment of the disclosure may be a direct connection or an indirect connection.

Hereinafter, the optional embodiments of the disclosure will be described from the following four aspects in conjunction with the accompanying drawings. Where, the optional embodiments of the four aspects may be implemented separately or implemented in combination with each other. In addition, the user data packets described in the optional embodiments of the disclosure may be uplink data packets or downlink data packets. In the description of some embodiments, although only uplink data packets or downlink data packets may be illustrated, it is understandable to those skilled in the art that, based on the description of the uplink data packet in each optional embodiment of the disclosure as an example, those skilled in the art may easily think of corresponding implementations corresponding to the uplink data packet. Similarly, based on the description of the downlink data packet in each embodiment as an example, those skilled in the art may also think of an embodiment corresponding to the uplink data packet.

The First Aspect: the Avoidance Mechanism of Data Packet Loss in the Relay Network In the relay network, the relay node may migrate (that is, the parent node to which it is connected changes). In this process, there are still some data packets on the source path that have not been transmitted to the target node (i.e., the target receiving node). For example, the target node may be a migrated relay node (i.e., a migrated relay node), or a child node of the migrated relay node, or the donor node directly or indirectly connected to the migrated relay node, or the central unit of the donor node, or the control plane part of the central unit of the donor node, or the user plane part of the central unit of the donor node. These data will be lost due to the migration of the relay node. In order to avoid the loss of data packets, the embodiment of the disclosure provides a communication method, which may be implemented between the donor node (or the central unit of the donor node, or the control plane part of the central unit of the donor node, or the user plane part of the central unit of the donor node) and the relay node, that is, the method is an interactive process between the donor node and the relay node, and the method may be implemented between the above first node and the second node.

Figure 5:
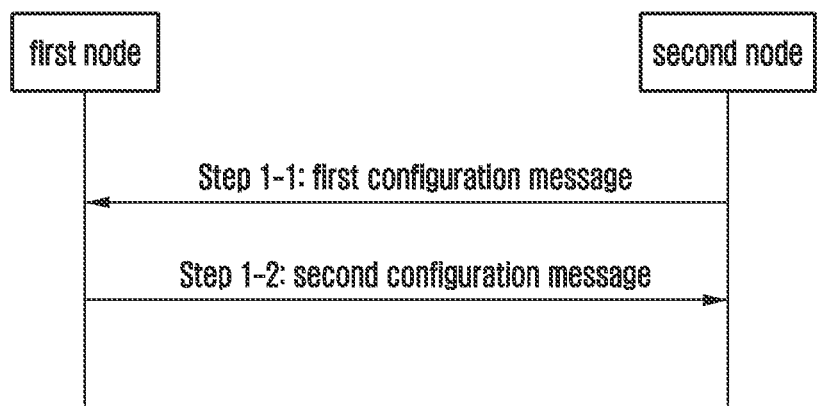
FIG. 5 is an example of a flowchart of a communication method according to a first aspect according to an embodiment of the disclosure.

FIG. 5 shows a schematic flowchart of a communication method according to an embodiment of the disclosure, and the method may include step 1-1 and/or step 1-2. Where, step 1-1 and step 1-2 may be implemented separately or implemented in combination with each other. As an optional embodiment, step 1-1 may be performed first, and then step 1-2 may be performed, as another embodiment, step 1-2 may be performed first, and then step 1-1 may be performed.

Referring to FIG. 5, the flow of the communication method may include the following steps:

Step 1-1: the second node transmits a first message (also called a first configuration message or other names, for example, the first message may be the first message transmitted after the second node receives a second message (which will be described in detail later), the first message may be called a response message) to the first node. The function of this message is to configure transmission and/or storage (or caching) of the user data packet by the first node. Another function of the message is to inform the first node of the enabling of the information transmitted by the second node (for example, enabling the transmission of the information contained in the second message), wherein the transmission may be transmitting data (transmitting the data packet) and/or receiving data (receiving the data packet).

Based on this optional embodiment, the second node may transmit a first message to the first node to inform the first node of related information of the data packet transmission and/or storage, such that the first node may determine whether it is necessary to store or cache the data packet according to the information in the first message, determine how to perform data packet transmission, so as to avoid the problem that the data packet cannot be transmitted to the target receiving node on the source path due to the migration of the relay node on the source path.

Alternatively, the first node may include at least one of the following: the migrated relay node; the distributed unit of the migrated relay node; the mobile terminal of the migrated relay node; the child node of the migrated relay node; the distribution of the child node of the migrated relay node; the mobile terminal of the child node of the migrated relay node; the parent node of the migrated relay node; the distributed unit of the parent node of the migrated relay node; the mobile terminal of the parent node of the migrated relay node.

The second node may include at least one of the following: the donor node; the central unit of the donor node; the control plane part of the central unit of the donor node; the user plane part of the central unit of the donor node; where, the donor node here is the donor node connected to the migrated relay node before being migrated or the donor node connected to the migrated relay node after migration.

It should be noted that the above process is given based on the migration of the first node. However, in actual situations, the above process may also be applied to the case where the first node does not migrate. At this time, the first node may include at least the following: the relay node; the distributed unit of the relay node; the mobile terminal of the relay node; the child node of the relay node; the distributed unit of the child node of the relay node; the mobile terminal of the child node of the relay node; the parent node of the relay node; the distributed unit of the parent node of the relay node; the mobile terminal of the parent node of the relay node.

The second node may include at least one of the following: the donor node; the central unit of the donor node; the control plane portion of the central unit of the donor node; the user plane part of the central unit of the donor node.

Alternatively, the above first message may be a first message corresponding to at least one user data packet, and the first message may include at least one of the following:

first information, which is used to indicate whether to transmit fourth information, wherein the fourth information is used to indicate a data packet delivery status;

second information, which is used to indicate whether to store/cache a data packet;

third information, which is used to indicate information related to the transmission address corresponding to the data packet, that is, the transmission address information related to the data packet;

fourth information, which is used to indicate a data packet delivery status; Alternatively, the fourth information may be used by the first node to determine the data packet to be transmitted and/or the transmission method of the data packet, such as which data packets are transmitted and what transmission rate are adopted, etc.;

seventh information, which is used to indicate node migration event notification information.

Where, the first information may also be called data packet delivery status enabling information, for example, indicating whether the second node will transmit the data packet delivery status information (for example, transmitting or not transmitting the data packet delivery status information), taking uplink data packet as an example, the information is uplink data packet delivery status enabling information.

The second information may also be called indication information for caching (storing) the data packet (for example, the indication information for caching the uplink data packet). The function of the indication information is to indicate whether the first node needs to cache (store) the uplink data packet, for example, indicating it is necessary to cache (store) the uplink data packet or it is not necessary to cache (store) the uplink data packet.

The third information may also be called information about the address, which indicates information about the address for transmitting the user data.

The fourth information may also be called Data Delivery Status (DDS) information. The function of the information is to indicate information related to the status of the data packet transmitted (receiving and/or transmitting) by the second node. In an embodiment, if the above fourth information is for uplink data packets, the fourth information is information about the uplink data packet delivery status, such as UL DDS. In another embodiment, if the above fourth information is for the downlink data packet, the above fourth information is the information about the downlink data packet delivery status, such as DL DDS.

It should be noted that the above first message contains multiple information (which may be multiple information among the first information, the second information, the third information, the fourth information, and the seventh information, or it may refer multiple information contain at least one of the first information, the second information, the third information, the fourth information, and the seventh information), the multiple information may be transmitted together, may also be transmitted separately, may also be transmitted in multiple times (one or more piece of information may be transmitted at a time). In other words, the multiple information may be transmitted synchronously or asynchronously. Alternatively, the information in the first message and the information in the second message to be described below may also be transmitted interactively. For example, the second node transmits the information a (one or more pieces of information that the first message may contain) in the first message to the first node, the first node transmits a piece of information b (one or more pieces of information that the second message may contain) to the second node based on the information a, and the second node may then transmit other information in the first message to the first node based on the information.

In addition, the indication method for indicating the information t may be an explicit indication or an implicit indication, that is, the information to be indicated may be directly informed through a message, or the information to be indicated may be informed implicitly by a predefined method. For example, taking the above second information as an example. Alternatively, the second information may be information that directly indicates whether to cache or not to cache, for example, the information "1" represents to cache, the information "0" represents not to cache, and or the indication may be implemented in other method, for example, if the first information indicates that the fourth information will be transmitted, it may implicitly indicate that the fourth information is to be cached, and if the first information indicates that the fourth information is not to be transmitted, it represents that it implicitly indicates not to cache.

In an optional embodiment of the disclosure, at least one of the above first message, fourth message, or seventh information is also used to indicate whether to cache the data packet.

In other words, the above second information may include at least one of the following: first information; fourth information; cache indication information; node migration event notification information (seventh information).

In other words, the content indicated by the second information may be implicitly realized through the content indicated by one or more pieces of the first information, the fourth information and the seventh information in a predefined way manner, for example, taking the fourth information as an example, if the first message contains the fourth information, it represents that it needs to be cached. If the first message does not contain the fourth information, it does not need to be cached. The cache indication information uses a direct indication method to indicate whether to cache or not. The node migration event notification information is used to indicate that the relay node will migrate on a source path where the first node is located. The information may be used to implicitly inform whether it is necessary to cache. For example, if the notification information is contained in the first message, it means it is necessary to cache.

In an optional embodiment of the disclosure, the transmission address information corresponding to the above data packet includes at least one of the following information used by the first node and/or the second node to transmit the data packet: BAP address information, IP address information, tunnel identification information.

In other words, the above transmission address information corresponding to the data packet may include at least one of the following: address information used by the first node to transmit the data packet; address information used by the second node to transmit the data packet; tunnel identification information corresponding to the first node; tunnel identification information corresponding to the second node.

Where, for any of the above address information, the address information may include, but is not limited to, a BAP (Backhaul Adaptation Protocol) address, an IP (Internet Protocol address), and the like. Taking the address information used by the first node to transmit the data packet as an example, the address information may be the BAP address and/or IP address used by the first node to transmit/receive the data packet. The above tunnel identification information is tunnel endpoint identifier (TEID), which is the identification information of the tunnel used to transmit the data packet.

In an optional embodiment of the disclosure, the above fourth information may include at least one of the following:
  transmission expectation information of the data packet for the second node;
  information related to at least one first data packet, wherein the first data packet includes at least one of the following:
  lost data packets; successfully transmitted data packets (also called non-retransmission data packets successfully transmitted or initial transmission data packets successfully transmitted); retransmission data packets successfully transmitted;
  data packets unsuccessfully transmitted (also called non-retransmission data packets unsuccessfully transmitted or initial transmission data packets unsuccessfully transmitted); retransmission data packets unsuccessfully transmitted.

Where, the above transmission expectation information refers to the information related to the transmission, which is expected/desired by the second node when the first node performs data packet transmission with the second node. Alternatively, the transmission expectation information may include but is not limited to at least one of: the expected buffer size (the expected transmitted data volume) and the expected transmission rate. Taking the uplink data packet as an example, the above information related to at least one first data packet may include at least one or more of the following information: information related to the lost data packets, information related to data packets successfully received, and information related to the data packets (initial transmission data packets) unsuccessfully received, information related to retransmission data packets successfully received, and information related to retransmission data packets unsuccessfully received.

In an optional embodiment of the disclosure, the above information related to the at least one first data packet includes at least one of the following:
  data packet identification information of at least one first data packet;
  number information of the first data packets continuously transmitted;
  delivery status indication information of the at least one first data packet.

Where, the above data packet identification information is information that can uniquely identify a data packet. Furthermore, the identification information may indicate information about the data packet(s) associated with the data packet corresponding to the identification information. For example, the identification information may be the sequence number of the data packet, when the transmitted data packets are numbered in a continuous sequence numbering method, the sequence number of a data packet represents the data packet, and the information of the data packet(s) associated with the data packet may be obtained based on such data packet, for example, the sequence number of a data packet is the largest sequence number of a data packet which is numbered in a continuous sequence numbering method, and it may be known that the data packet is the last data packet in a group of data packets. Alternatively, the identification information of a data packet may be the PDCP SN (sequence number) of the data packet, the NR-U (New Radio User plane) sequence number, etc.

Alternatively, the delivery status indication information of the at least one first data packet includes: bitmap information of whether the first data packet is lost or whether the first data packet is received successfully. For a data packet, the above delivery status indication information refers to the indication information that characterizes whether the data packet is successfully transmitted. For example, taking a lost data packet as an example, the indication information may indicate whether the data packet is lost, for example, a bit may be used to indicate a data packet. For example, the bit value of "1" means the data packet is lost, and "0" means the data packet is not lost.

In an optional embodiment of the disclosure, the above data packet identification information of the at least one first data packet includes at least one of the following:
  identification information of the last transmitted data packet among the first data packets (theoretically, the last transmission means that: if the data packets are transmitted in order, the "last" here refers to the theoretically last transmitted data packet among a group of data packets transmitted in order). Taking the identification information being the sequence number of the data packet and the data packet being the uplink data packet as an example, the identification information may be at least one of the following: a termination sequence number of the lost data packet, the termination sequence number of the successfully received data packet, and the termination sequence number of the unsuccessful received data packet, the termination sequence number of successfully received retransmission data packet, and the termination sequence number of unsuccessfully received retransmission data packet;
  identification information of the first (theoretically) transmitted data packet among the first data packets. For example, taking the uplink data packet as an example, the above identification information may include at least one of the followings: the starting sequence number of the lost data packet, the starting sequence number of the data packet successfully received, the starting sequence number of the data packet unsuccessfully received, the starting sequence number of the retransmission data packet successfully received, and the starting sequence number of the retransmission data packet unsuccessfully received;
  identification information of the first (theoretically) transmitted data packet among the first data packets continuously transmitted, for example, the identification information includes: the lowest sequence number of the data packet successfully received in order, the lowest sequence number of the data packet unsuccessfully received in order, the lowest sequence number of the retransmission data packet unsuccessfully received in order. For example, taking continuously successfully received data packets (that is, a group of successfully received data packets with continuous sequence numbers) as an example, according to the sequence number of the data packet, if the sequence numbers of successfully received data packets are data packet 1, data packet 2, and data packet 3, the identification information is the sequence number of data packet 1.
  identification information of the last (theoretically) transmitted data packet among the first data packets continuously transmitted, for example, the identification information includes the largest sequence number among data packets sequentially lost, the largest sequence number of the data packet successfully received in order, and the largest sequence number of the retransmission data packet successfully received in order. Taking data packets which are lost during transmission and have continuous sequence numbers as an example, the identification information may be the largest sequence number among a group of lost data packets.

In order to better understand and explain the various information that may be carried in the above first message, the following uplink data packet is taken as an example to explain various information that may be included in the above first message.

Between the first node and the second node, data packets of multiple radio bearers may need to be transmitted. For one or more radio bearers, the above first message includes at least one of the following information:
  Data packet delivery status enabling information (corresponding to the above first information), the function of the information is to indicate whether the second node will transmit the data packet delivery status information, for example, indicate to transmit or not transmit. In an optional embodiment, for an uplink data packet, if the second node will transmit data packet delivery status information (the information may be uplink data packet delivery status information) to the first node, then the first node may start caching the uplink data packets it transmits, otherwise, the first node may not need to cache the uplink data packets it transmits.
  Indication information for indicating to cache the data packet (corresponding to the above second information), the function of the information is to indicate whether the first node needs to cache the data packet, for example, the first node needs to cache the data packet, or does not need to cache the data packet, the cached data packet may be an uplink data packet and/or a downlink data packet.

information related to address (corresponding to the above third information), which indicates information related to the address used to transmit user data, and the information includes at least one of the following information:

address information at the second node (corresponding to the address information used by the second node to transmit the data packet), such as BAP address, IP address tunnel identification information at the second node (corresponding to the tunnel identification information of the second node), such as tunnel endpoint identifier (TEID)

Address information at the first node (corresponding to the address information used by the first node to transmit the data packet), such as BAP address, IP address, the information includes at least one of the following information:

old address information, such as the old BAP address, the old IP address, the old address may be the address information used before the configuration of the first node is updated, or may be the address information used before the migration of the first node new address information, such as a new BAP address, a new IP address. The new address may be the address information used after the configuration of the first node is updated, or may be the address information used after the migration of the first node. In an embodiment, when the first node retransmits a lost or unsuccessfully received data packet, it updates its contained address at first node to the new address information tunnel identification information at the first node side (tunnel identification information corresponding to the second node), such as tunnel endpoint identifier (TEID)

data packet delivery status (DDS) information (corresponding to the above fourth information). For the uplink data packet, the function of the information is to indicate information related to the status of the uplink data packet received by the second node, thereby helping the first node to transmit the uplink data packet; the information includes at least one of the following information:

expected buffer size which has the function of indicating the size of the amount of data that the second node expects to receive. In an embodiment, the size of the amount of data is the size of the amount of data expected to be received by the second node after a certain packet (for example, the data packet may be the data packet with the largest sequence number among the data packets received in order)

expected data rate, which has the function of indicating the data transmission rate expected by the second node information related to the lost data packet, which has the function of indicating the lost data packet learned by the second node. The information includes at least one of the following information:

the starting sequence number of the lost data packet, such as PDCP SN, NR-U sequence number. In an embodiment, the starting sequence number is the lowest sequence number of the lost data packet among a group of lost data packets with consecutive sequence numbers. In another embodiment, the starting sequence number is the sequence number of the first lost data packet among a group of data packets.

the termination sequence number of the lost data packet, such as PDCP SN, NR-U sequence number. In an embodiment, the termination sequence number is the largest sequence number of the lost data packet among a group of lost data packets with consecutive sequence numbers. In another embodiment, the termination sequence number is the sequence number of the last lost data packet among a group of data packets.

bitmap information indicating whether the data packet is lost, each bit in the bitmap indicates whether the corresponding data packet is lost, for example, "1" represents lost, "0" represents not lost In an embodiment, the above lost data packets may include multiple groups of data packets with consecutive sequence numbers. For each group of data packets with consecutive sequence numbers, at least one of the above information (for example, the starting sequence number of the lost data packet, the termination sequence number of the lost data packet, and the bitmap information for indicating whether the data packet is lost) may be given separately.

information related to the successfully received data packet, which has the function of indicating the data packet correctly received by the second node. The data packet may be a data packet newly transmitted by the first node or may be a data packed retransmitted by the first node, the information includes at least one of the following information:

the largest sequence number of data packet among the data packets successfully received in order, such as PDCP SN, NR-U sequence number, etc. In an embodiment, data packets successfully received in order are a group of successfully received data packets with consecutive sequence numbers.

The starting sequence number of the successfully received data packet, such as PDCP SN, NR-U sequence number. In an embodiment, the starting sequence number is the lowest sequence number of the data packet among a group of successfully received data packets with consecutive sequence numbers. In another embodiment, the starting sequence number is the sequence number of the first successfully received data packet among a group of data packets.

the termination sequence number of the successfully received data packet, such as PDCP SN, NR-U sequence number. In an embodiment, the termination sequence number is the largest sequence number of the data packet among a group of successfully received data packets with consecutive sequence numbers. In another embodiment, the termination sequence number is the sequence number of the last successfully received data packet among a group of data packets.

the bitmap information indicating whether the data packet is successfully received. Each bit in the bitmap indicates whether the corresponding data packet is successfully received, for example, "1" represents successful reception, "0" represents unsuccessful reception, or "1" represents unsuccessful reception, "0" represents successful reception.

In an embodiment, the successfully received data packet may include multiple groups of data packets with consecutive sequence numbers. For each group of data packets with consecutive sequence numbers, at least one of the above information (for example, the starting sequence number of the successfully received data packet, the termination sequence number of the successfully received data packet, and the bitmap information indicating whether the data packet is successfully received) may be given separately.

information related to the unsuccessfully received data packet, which has the function of indicating the data packet that the second node does not receive correctly. The data packet may be a data packet newly transmitted by the first node or may be a data packet retransmitted by the first node. The information includes at least one of the following information:

- the lowest sequence number of the data packet of data packets unsuccessfully received in order, such as PDCP SN, NR-U sequence number, etc. In an embodiment, the data packets unsuccessfully received in order are a group of unsuccessfully received data packets with consecutive sequence numbers.
- the starting sequence number of unsuccessfully received data packets, such as PDCP SN, NR-U sequence number. In an embodiment, the starting sequence number is the lowest sequence number of the data packet among a group of unsuccessfully received data packets with consecutive sequence numbers. In another embodiment, the starting sequence number is the sequence number of the first unsuccessfully received data packet among a group of data packets.
- the termination sequence number of unsuccessfully received data packets, such as PDCP SN, NR-U sequence number. In an embodiment, the termination sequence number is the largest sequence number of the data packet among a group of unsuccessfully received data packets with consecutive sequence numbers. In another embodiment, the termination sequence number is the sequence number of the last unsuccessfully received data packet among a group of data packets.
- the bitmap information indicating whether the data packet is successfully received. Each bit in the bitmap indicates whether the corresponding data packet is successfully received, for example, "1" represents unsuccessful reception, "0" represents successful reception, or "1" represents successful reception, "0" represents unsuccessful reception.

In an embodiment, the unsuccessfully received data packet may include multiple groups of data packets with consecutive sequence numbers. For each group of data packets with consecutive sequence numbers, at least one of the above information (for example, the starting sequence number of the unsuccessfully received data packet, the termination sequence number of the unsuccessfully received data packet, and the bitmap information indicating whether the data packet is successfully received) may be given separately information related to the successfully received retransmission data packet, which has the function of indicating the retransmission data packet correctly received by the second node. The information includes at least one of the following information:

- the largest sequence number of retransmission data packets successfully received in order, such as PDCP SN, NR-U sequence number, etc. In an embodiment, the retransmission data packets successfully received in order are a group of successfully received retransmission data packets with consecutive sequence numbers
- the starting sequence number of the successfully received retransmission data packet, such as PDCP SN, NR-U sequence number. In an embodiment, the starting sequence number is the lowest sequence number of the data packet among a group of successfully received retransmission data packets with consecutive sequence numbers, in another embodiment, the starting sequence number is the sequence number of the first successfully received retransmission data packet among a group of retransmission data packets
- the termination sequence number of the successfully received retransmission data packet, such as the PDCP SN, NR-U sequence number. In an embodiment, the termination sequence number is the largest sequence number of the data packet among a group of successfully received retransmission data packets with consecutive sequence numbers. In another embodiment, the termination sequence number is the sequence number of the last successfully received retransmission data packet among a group of retransmission data packets
- the bitmap information indicating whether the retransmission data packet is successfully received, each bit in the bitmap indicates whether the corresponding retransmission data packet is successfully received, for example, "1" represents the data packet is lost, "0" represents the data packet is not lost In an embodiment, the successfully received retransmission data packet may include multiple groups of data packets with consecutive sequence numbers. For each group of retransmission data packets with consecutive sequence numbers, at least one of the above information may be given separately (for example, the starting sequence number of the retransmission data packet successfully received, the termination sequence number of the retransmission data packet successfully received, bitmap information for indicating whether the retransmission data packet is successfully received)

information related to unsuccessfully received retransmission data packets, which has the function of indicating the retransmission data packets incorrectly received by the second node. The information includes at least one of the following information:

- the lowest sequence number of retransmission data packets unsuccessfully received in order, such as PDCP SN, NR-U sequence number, etc. In an embodiment, the retransmission data packets unsuccessfully received in order are a group of unsuccessfully received retransmission data packets with consecutive sequence numbers.
- the starting sequence number of the unsuccessfully received retransmission data packet, such as PDCP SN, NR-U sequence number, in an embodiment, the starting sequence number is the lowest sequence number of the data packet among a group of unsuccessfully received retransmission data packets with consecutive sequence numbers. In another embodiment, the starting sequence number is the sequence number of the first unsuccessfully received retransmission data packet among a group of retransmission data packets.
- the termination sequence number of unsuccessfully received retransmission data packets, such as PDCP SN, NR-U sequence number, in an embodiment, the termination sequence number is the largest sequence number of the data packet among a group of unsuccessfully received retransmission data packets with consecutive sequence numbers. In another embodiment, the termination sequence number is the sequence number of the last unsuccessfully received retransmission data packet among a group of retransmission data packets.

bitmap information for indicating whether the retransmission data packet is successfully received. Each bit in the bitmap indicates whether the corresponding retransmission data packet is successfully received. For example, "1" represents unsuccessful reception, "0" represents successful reception, or "0" represents unsuccessful reception, "1" means successful reception.

In an embodiment, the unsuccessfully received retransmission data packet may include multiple groups of data packets with consecutive sequence numbers. For each group of retransmission data packets with consecutive sequence numbers, at least one of the above information (for example, the starting sequence number of the unsuccessfully received retransmission data packet, the termination sequence number of the unsuccessfully received retransmission data packet, the bitmap information indicating whether the retransmission data packet is successfully received) may be given separately.

After the first node receives the first message, it may perform data transmission and storage. For example, the first node may start caching the data packets that it has sent out, and may retransmit the lost data packet or the unsuccessful data packet which is not successfully received by the second node according to the first message.

Based on the one or more indication information carried in the first message, the first node may determine whether the data packet needs to be cached according to the first message, and may also determine the data packet to be transmitted according to the first message. For example, the first node may transmit the data packet (which is not received by the second node) to the second node based on the first message.

As another optional embodiment of the first aspect, the communication method may further include:

Step 1-2: the first node transmits a second message (also called a second configuration message, a notification message, or other names. Alternatively, if the second message is transmitted based on the reception of the first message, the second message may also be called a response message) to the second node, wherein the message is used to inform the second node of the information of the transmission (transmitting and/or receiving) and/or storage of the user data packet by the first node, that is, the function of the message is to indicate data transmission and/or storage at the relay node.

Alternatively, with the second node as the execution subject, the step 1-2 may be described as: receiving the second message transmitted by the first node.

In an optional embodiment of the disclosure, the second message is a response message of the above first message, or the above first message is a response information for the second message.

In other words, when the solution provided by the disclosure is implemented, step 1-1 may be executed first, and then step 1-2 may be executed, or step 1-2 may be executed first, and then step 1-1 may be executed, of course, step 1-1 and step 1-2 may be implemented separately.

In an optional embodiment of the disclosure, the above second message may include at least one of: fifth information and information related to at least one second data packet.

Where, the fifth information is used to inform the second node whether the fourth information needs to be transmitted, and the fourth information is used to indicate the data packet delivery status; Alternatively, the fifth information may also be called polling indication information of data delivery status information, the function of which is to inform the second node whether it is necessary to transmit data delivery status information to the first node. Alternatively, in this case, the first message may be a response to the second message, that is, the first node first transmits the polling indication information of the uplink data delivery status information to the second node, and then the second node feeds back the first message to the first node according to the polling indication information of the uplink data delivery status information.

The above second data packet may include at least one of the following:
the data packet that the first node needs to transmit to the second node; the data packet that the first node caches (stores);
the data packet received by the first node; and
the retransmission data packet.

Where, the retransmission data packet may be an uplink retransmission data packet and/or a downlink retransmission data packet.

In an optional embodiment of the disclosure, the above information related to at least one second data packet includes at least one of the following:

at least one data packet that the first node needs to transmit to the second node. Alternatively, the information may be used by the second node to feed back fourth information, and the fourth information is used to indicate the data packet delivery status;

data packet identification information of at least one second data packet. Alternatively, the information is used to indicate to the second node information about the data packet cached by the first node;

number information of the second data packet. Alternatively, the number information may be used to indicate to the second node of the information of the data packet cached by the first node;

indication information for indicating whether at least one second data packet is cached. Alternatively, the information may indicate to the second node information about the data packet cached by the first node;

indication information for indicating whether the at least one second data packet is a retransmission data packet. Alternatively, the information may be used to inform the second node whether the data packet corresponding to the indication information is a retransmission data packet, for example, the information may be used to inform whether the data packet received by the second node is a retransmission data packet.

In other words, taking the uplink data packet as an example, the above at least one data packet that the first node needs to transmit to the second node may be at least one data packet that the first node needs to retransmit to the second node (for example, a lost data packet or a data packet that the second node does not successfully receive). The data packet identification information may be the sequence number information of the data packet (such as the lowest sequence number or the largest sequence number), such as PDCP SN, NR-U sequence number, etc. The indication information of the data packet identification information of the at least one second data packet may be the indication information of the lowest sequence number of the second data packet. Taking the data packet cached by the first node as an example, the number information of the second data packet refers to the number of data packets cached by the first node. For a data packet, the above indication information for indicating whether the data packet is a retransmission data packet is the information used to indicate whether the data packet is a retransmission data packet. For example, the indication information of a data packet may be indicated by one bit. If the value of the bit is "1", it represents that the data packet corresponding to the bit is a retransmission data packet, and if the value of the bit is "0", it represents that the data packet corresponding to the bit is not a retransmission data packet.

In an optional embodiment of the disclosure, the second message is response information of the first message, and the first message includes indication information of the address information used by the first node to transmit the data packet; Alternatively, the address information contained in the at least one data packet that the first node needs to transmit to the second node. For example, the first message includes the address information at the first node, and the information at the first node in the data packet transmitted by the first node to the second node may be the address at the first node indicated in the second message.

In order to better understand and explain the above second message, the following uplink data packet is taken as an example to describe the message in detail. Alternatively, the message may include at least one of the following information:

data packet, which is the data packet that the first node needs to transmit to the second node. Alternatively, the data packet may also contain the sequence number information of the data packet, such as PDCP SN, NR-U sequence number; in an optional embodiment, the data packet may be a retransmission data packet (for example, the lost data packet or the unsuccessfully received data packet indicated in step 1-1). Alternatively, the second message may be the response message for the first message, the first message may contain the address information at the first node. At this time, for the data packet that the first node needs to transmit to the second node, the first node may update the address information at the first node contained in the data packet to the new address configured in above step 1-1 (see "address information at the first node" in the "information related to the address" contained in above step 1-1).

Polling indication information of uplink data delivery status information (corresponding to the above fifth information), the function of which is to inform the second node whether it is necessary to transmit data delivery status information to the first node.

information related to the cached data packet (corresponding to the above information related to at least one cached data packet), which is used to indicate the information related to the data packet cached at the first node, and the information includes at least one of the following information:

the lowest sequence number of the cached data packet, such as PDCP SN indication information of the lowest sequence number, which has the function of indicating that the sequence number of the data packet contained in the second configuration message is the lowest sequence number in the data packets cached at the first node the largest sequence number of the cached data packet, such as PDCP SN bitmap information for indicating the cached data packet, each bit in the bitmap indicates whether the corresponding data packet is cached, for example, "1" represents that the corresponding data packet is cached, "0" represents that the corresponding data packet is not cached information related to the received data packet (corresponding to the above related information of at least one data packet received by the first node), the received data packet is a data packet transmitted by the user (i.e., UE) to the first node, and the information includes at least One of the following information:

the largest sequence number of the data packet, the largest sequence number of the data packet received from the user.

Indication information of the retransmission data packet, which has the function of indicating whether the above "data packet" is the retransmission data packet. If it is, it indicates that the above "data packet" has been transmitted; otherwise, it indicates the above "data packet" is transmitted the first time.

As an optional embodiment of the disclosure, after the second node receives the second message, it may determine the storage and transmission condition of the user data in the first node, and determine to the transmission of its own data status information. For example, the second node may generate the content in the UL DDS according to the data packets cached at the first node. For example, for a data packet which is not cached at the first node, the second node will not inform the first node whether the data packet is lost or received unsuccessfully even if the data packet is not received; for another example, the second node may determine when to transmit UL DDS according to the information contained in the second message, for example, the second node will transmit the UL DDS after the second node correctly receives all the data packets prior to the data packet cached by the first node with the lowest sequence number; for another example, the first message is transmitted until the polling information in the second message is received by the second node.

Based on the above second message, the second node may determine the related information of the first node corresponding to the at least one second data packet, so that it may perform data interaction with the first node based on the second message. For example, the second message may contain indication information of the uplink data packet cached at the first node, and the second node may determine the data cached at the first node based on the indication information, thereby knowing the data packet cached at the first node may be transmitted.

From the above description, it may be seen that steps 1-1 and 1-2 in the above process may be executed independently or successively. The first configuration message may be a control plane message (for example, an F1AP message, such as a UE Context Setup/Modification Request message, or an RRC message, or a newly defined message) or a user plane message (for example, an F1-U message, such as DL USER DATA messages, or a newly defined message), or other messages. The second configuration message may be a control plane message (for example, an F1AP message, such as a UE Context Setup/Modification Response message, or an RRC message, or a newly defined message), or a user plane message (for example, an F1-U message, such as DL DATA DELIVERY STATUS message, or a newly defined message), or other messages.

In addition, the above steps 1-1 and 1-2 are described in a way that the first node and the second node interact. It is understandable that for each of the above optional embodiments, the steps involved in the interaction between the first node and the second node, for example, the step that the second node transmits a first message to the first node, and the step that the second node transmits a second message to the first node may be described separately from the first node or the second node, that is, the first node may be used as the execution subject of each optional implementation scheme, or the second node may be used as the execution subject of the scheme.

Alternatively, with the above first node as the execution subject, the above communication method may include: transmitting a second message, wherein the second message is used to inform the second node of the transmission and/or storage (or caching) of the user data packet by the first node.

Alternatively, the method may further include: receiving a first message, wherein the first message is used to indicate the transmission and/or storage (or caching) of the user data packet by the first node.

Where, the first message may be a response message of the second message, or the second message may be a response message for the first message. That is, the second node may transmit the first message to the first node, and the second node may transmit the second message to the second node based on the received first message; or the first node may transmit the second message to the second node, after that the first node receives the first message transmitted by the second node based on the second message.

Alternatively, with the above first node as the execution subject, the above communication method may include: receiving a first message transmitted by the second node, wherein the first message is used to configure the transmission and/or storage of the user data packet by the first node.

Alternatively, the method may further include: transmitting a second message, wherein the second message is used to inform the second node of information about the transmission and/or storage of the user data packet by the first node; the second message is a response message for the first message, or the first message is response information for the second message.

Alternatively, the method may also include:
the first node configures the transmission and/or storage of the user data packet according to the first message; where, the configuring the transmission and/or storage of the user data packet according to the first message includes at least one of the following:
determining whether to cache the data packet according to the first information;
determining whether to cache the data packet according to the second information;
determining the information related to the transmission address for transmitting the data packet according to the third information;
determining whether to transmit the cached data packet according to the fourth information; and
determining whether to cache the data packet according to the seventh information.

Where, for details of the description of the first message and the second message, please refer to the description of the first message and the second message in the preceding text, which will not be repeated here.

Based on the optional embodiments provided in the first aspect, the solution provided in the disclosure may at least have the following beneficial effects:

1. The relay node (the first node) may determine whether the data packet needs to be cached according to the configuration message (the first configuration message).

2. The relay node (the first node) may determine the data packet to be transmitted according to the configuration message (the first configuration message). For example, the first node may transmit the data packet that the second node has not received.

3. The donor node (the second node) may determine the data packets cached at the relay node (the first node), so that the donor node (the second node) may know that only the data packet cached at the relay node may be transmitted.

In order to better illustrate the solution provided by the first aspect of the disclosure, the solution will be described below in conjunction with several optional embodiments. It is understandable that the following descriptions are optional implementations of the solution of the disclosure. It should not be construed as a limitation on the solution of the disclosure.

Embodiment 1: the donor node decides to transmit UL DDS by itself. Alternatively, Embodiment 1 may include the following steps:

Step 1-1-1: the second node transmits configuration message 1 (an optional solution of the first message) to the first node. The function of the message is to provide the first node with information about the data reception condition. The message includes at least one of the following information:
first information of the data packet delivery status. For the content contained in the information, please refer to the "data packet delivery status information" in above step 1-1.

Step 1-1-2: the first node transmits configuration message 2 (an optional solution of the second message) to the second node. The function of the message is to retransmit the lost data packet or the unsuccessfully received data packet indicated in step 1-1-1. For the information contained in this message, please refer to the "second message" in above step 1-2. Further, the first node will update the address information at the first node contained in the retransmission data packet to the new address information, and the new address information may be configured according to the following steps 1-1-0:

Step 1-1-0: the second node transmits configuration message 3 (an optional solution of the first message) to the first node. The function of the message is to provide the first node with the configuration of the retransmission data packet. The message includes at least one of the following information:
first information related to the address. For the content contained in the information, please refer to the "information related to address" in above step 1-1.

Where, the above step 1-1-0 is an optional step. Alternatively, the step 1-1-0 may occur before the step 1-1-2.

Embodiment 2: the donor node enables the IAB node to cache the data packet. This optional embodiment may include the following steps:

Step 1-2-1: the second node transmits configuration message 4 (an optional solution of the first message) to the first node. The function of this message is to provide the first node with the configuration of the retransmission data packet. The message includes at least one of the following information:
first information of the data packet delivery status enabling. For the information contained in the information, please refer to the "data packet delivery status enabling information" in above step 1-1.
first indication information for indicating to cache the data packet. For the information contained in the information, please refer to the "indication information for indicating to cache the data packet" in above step 1-1.

Step 1-2-2: the first node starts to cache the data (that is, the data packet) received from the user. For example, the first node starts to cache the data packet according to the above "first indication information for indicating to cache the data packet".

Step 1-2-3: the second node transmits configuration message 5 (an optional solution of the first message) to the first node. The function of this message is to provide the first node with information about the data reception condition. The message includes at least one of the following information:

second information of the data packet delivery status. For the content contained in the information, please refer to the "data packet delivery status information" in above step 1-1.

Step 1-2-4: the first node transmits configuration message 6 (an optional solution of the second message) to the second node. The function of this message is to retransmit the lost data packet or unsuccessfully received data packet indicated in step 1-2-3. For the information contained in this message, please refer to the "second message" in above step 1-2. Alternatively, the first node will update the address information at the first node contained in the retransmission data packet to new address information, and the new address information may be configured according to the following steps 1-2-0:

Step 1-2-0: the second node transmits configuration message 7 (an optional solution of the first message) to the first node. The function of this message is to provide the first node with the configuration of the retransmission data packet. The message includes at least one of the following information:

second information related to the address. For the content contained in the information, please refer to the "information related to the address" in step 1-1 above Where, the above step 1-2-0 is an optional step. Alternatively, step 1-2-0 may occur before step 1-2-4.

Embodiment 3: the donor node enables the IAB node to cache the data packet, and transmit UL DDS based on the lowest PDCP SN (lowest sequence number). This embodiment may include the following steps:

Step 1-3-1: the second node transmits a configuration message 8 (an optional solution of the first message) to the first node. The function of this message is to provide the first node with a configuration for the retransmission data packet. The message includes at least one of the following information:

second information of the data packet delivery status enabling. For the information contained in the information, please refer to the "data packet delivery status enabling information" in above step 1-1.

second indication information for indicating to cache the data packet. For the information contained in the information, please refer to the "indication information for indicating to cache the data packet" in above step 1-1.

Step 1-3-2: the first node starts to cache the data received from the user. This step may be that the first node starts to cache the data packet based on the configuration message 8 of step 1-3-1. Further, this embodiment may also include: the first node transmits a configuration message 9 (an optional solution of the second message) to the second node, the function of the message is to indicate the data packet cached at the first node, and the message includes at least one of the following information:

first information related to the cached data packet. For the content contained in the information, please refer to the "information related to the cached data packet" contained in the above step 1-2;

first information related to the received data packet. For the content contained in the information, please refer to the "information related to the received data packet" contained in the above step 1-2.

Step 1-3-3: the second node transmits a configuration message 10 (an optional solution of the first message) to the first node. The function of this message is to provide the first node with information about the data reception condition. The message includes at least one of the following information:

third information of the uplink data packet delivery status. For the content contained in the information, please refer to the "uplink data packet delivery status information" in above step 1-1.

Step 1-3-4: the first node transmits configuration message 11 (an optional solution of the second message) to the second node. The function of this message is to retransmit the lost data or unsuccessfully received packets indicated in step 1-3-3. For the information contained in this message, please refer to the "second configuration message" in above step 1-2.

Further, alternatively, the first node will update the address information of the first node contained in the retransmission data packet to new address information, and the new address information may be configured according to the following steps 1-3-0:

Step 1-3-0: the second node transmits a configuration message 12 (an optional solution of the first message) to the first node. The function of this message is to provide the first node with the configuration of the retransmission data packet. This message includes at least one of the following information:

second information related to the address. For the content contained in the information, please refer to the "information related to the address" in above step 1-1.

Where, the above step 1-3-0 is an optional step, and this optional step may occur before step 1-3-4.

Embodiment 4: the IAB node polls the UL DDS. Alternatively, this embodiment may include the following steps:

Step 1-4-1: the first node transmits a configuration message 13 (an optional solution of the second message) to the second node. The function of this message is to provide the second node with information related to the cached data packet. The message includes at least one of the following information:

first polling indication information of the uplink data delivery status information. For the information, please refer to the "polling indication information of the uplink data delivery status information" in above step 1-2.

second information related to the cached data packet. For the content contained in the information, please refer to the "information related to the cached data packet" contained in the above step 1-2;

second information related to the received data packet. For the content contained in the information, please refer to the "information related to the received data packet" contained in the above step 1-2.

Step 1-4-2: the second node transmits a configuration message 14 (an optional solution of the first message) to the first node. The function of this message is to provide the first node with information about the data reception condition. This message includes at least one of the following information:

fourth information of the uplink data packet delivery status. For the content contained in the information, please refer to the "uplink data packet delivery status information" in above step 1-1.

Step 1-4-3: the first node transmits a configuration message 15 (an optional solution of the second message) to the second node, and the function of this message is to retransmit the lost data packet or the unsuccessfully received data packet indicated in step 1-4-2. For the information contained in this message, please refer to the "second configuration message" in above step 1-2. Further, alternatively, the first node will update the address information of the first node contained in the retransmission data packet to new address information, the new address information may be configured according to the following steps 1-4-0:

Step 1-4-0: the second node transmits a configuration message 16 (an optional solution of the first message) to the first node. The function of this message is to provide the first node with the configuration of the retransmission data packet. The message includes at least one of the following information:

third information related to the address. For the content contained in the information, please refer to the "information related to the address" in above step 1-1.

The above step 1-4-0 is an optional step, and optionally, it may occur before step 1-4-3.

In practical applications, if the migration of the relay node causes the connected donor node to change, for example, migrating from the donor node 1 (or the central unit of the donor node 1, or the control plane part of the central unit of the donor node 1, or the user plane part of the central unit of the donor node 1) to the donor node 2 (or the central unit of the donor node 2, or the control plane part of the central unit of the donor node 2, or the user plane part of the central unit of the donor node 2). The above step 1-1 may occur between the donor node 1 and the first node, or between the donor node 2 and the first node, that is, the second node may be the donor node directly or indirectly connected to the first node in the source path before the migration, or may be the donor node directly or indirectly connected to the first node in the target path after migration; similarly, the above steps 1-2 may occur between the donor node 1 and the first node, or may occur between the donor node 2 and the first node. Further, if the data packet retransmitted by the first node is transmitted to the donor node 2, in the optional example of the first aspect, the above communication method may further include steps 1-3, that is, the donor node 2 will transmit the received retransmission data packet to the donor node 1, and further step 1-4 are included between the donor node 1 and the donor node 2: that is, the donor node 1 transmits a third configuration message to the donor node 2, and the function of this configuration message is to configure the reception of the data packet transmitted by the donor node 2 (the data packet may be a retransmission data packet), that is, the related information about the reception of the data packet transmitted by the donor node 2, that is, the donor node 2 may inform the donor node 1 how to receive the data packet, the message may include information of one or more radio bearers. For one or more radio bearers, the message includes at least one of the following information:

identification information of the radio bearer, that is, the identification information of the radio bearer corresponding to the data packet that the donor node 2 needs to transmit to the donor node 1.

address information of donor node 1, such as IP address, which is used to receive the data packet transmitted by the donor node 2.

identification information of the tunnel of the donor node 1, such as tunnel endpoint identifier (TEID), which is used to inform the donor node 1 the tunnel identification information of the transmission tunnel of the data packet at the donor node 1 when receiving the data packet transmitted by the donor node 2.

Second Aspect: Data Packet Transmission Mechanism in the Relay Network

In the relay network, the relay node may migrate (that is, the parent node to which it is connected changes). In this process, one or more nodes on the source path (one or more of these nodes may be present both on the source path and the target path) also cache some data packets which are not transmitted to the target node (that is, the target receiving node. For downlink data, the target node may be a migrated relay node or a child node of the migrated relay node. For uplink data, the target node may be a donor node, or a central unit of the donor node, or a control plane part of the central unit of the donor node, or a user plane part of the central unit of the donor node). In order to avoid the problem that the source transmitting node (For downlink data, the source transmitting node may be the donor node, or the central unit of the donor node, or the control plane part of the central unit of the donor node, or the user plane part of the central unit of the donor node. For uplink data, the source transmitting node may be a migrated relay node, or a child node of the migrated relay node) retransmits these data packet, that is, in order to avoid the problem that the source node needs to repeatedly transmit these data packets due to the migration of the relay node, and the continued transmission of the data packets may be realized, that is, these data packets may be continued to be transmitted to the target receiving node. The second aspect according to the disclosure provides a communication method. The purpose/function of the method is to configure the transmission of the data packet.

Figure 6A:
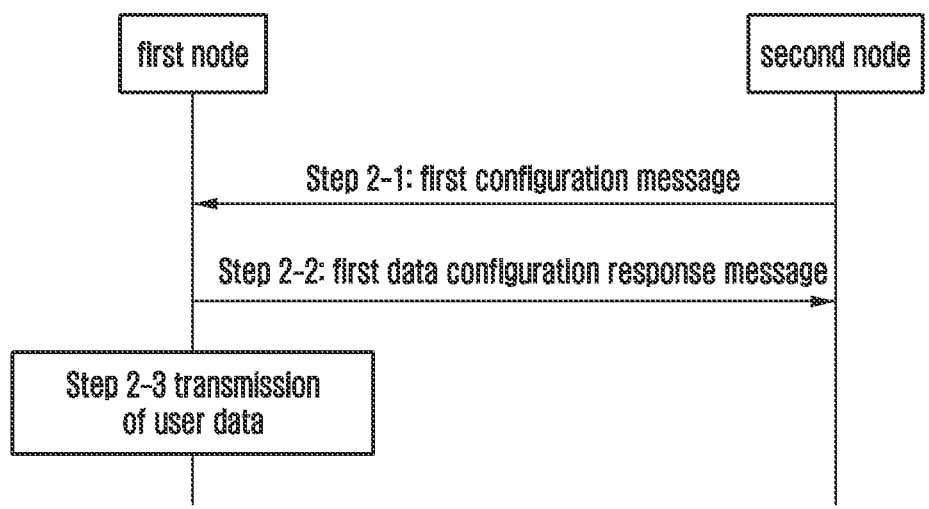
FIG. 6A is an example of a flowchart of a communication method according to a second aspect according to an embodiment of the disclosure.

FIG. 6A is an example of a flowchart of a communication method according to a second aspect according to an embodiment of the disclosure.

Referring to FIG. 6A, the method may include the following steps:

Step 2-1: the second node transmits a third message (also called a first data configuration message or other names) to the first node. The third message is used to configure the transmission of the user data packet corresponding to the first node, that is, used to configure the transmission of user data.

Where, with the first node as the execution subject, the method may include:

the first node receives the third message transmitted by the second node.

Alternatively, it may further include: the first node transmits the user data packet according to the third message. For example, the first node determines a transmission configuration of the data packet according to the third message, and transmits the user data packet based on the determined transmission configuration.

In an optional embodiment of the disclosure, the user data packet corresponding to the first node may include the user data packet corresponding to the node (before migration) corresponding to the first node (that is, the user data packet corresponding to the first node before migration), or the user data packet corresponding to the first node before the corresponding node configuration information is updated. Where, the user data packet corresponding to the first node may be a data packet to be transmitted by the first node, or may be a data packet received by the first node from other nodes/user terminals, or may be a data packet that the first node needs to transmit.

In an embodiment, the above user data (that is, the user data packet with respect to the third message) may be data transmitted via the source path before the configuration of the first node is updated or before the migration of the first node occurs. Further, alternatively, these data (i.e., data packets) may be cached in the first node. Where, for the data packet cached by the first node, please reference may be made to the description in the optional embodiment of the first aspect.

Alternatively, the first node in the embodiment of the second aspect may include at least one of the following: the migrated relay node; the distributed unit of the migrated relay node; the mobile terminal of the migrated relay node; the child node of the migrated relay node; the distribution unit part of the child node of the migrated relay node; the mobile terminal of the child node of the migrated relay node; the parent node of the migrated relay node; the distributed unit of the parent node of the migrated relay node; the mobile terminal of the parent node of the migrated relay node.

Alternatively, the second node in the embodiment of the second aspect may include at least one of the following: the donor node; the central unit of the donor node; the control plane part of the central unit of the donor node; the user plane part of the central unit of the donor node; wherein the donor node here may be the donor node corresponding to the migrated relay node before being migrated or may be the donor corresponding to the migrated relay node after migration.

In an optional embodiment of the disclosure, the above third message may include at least one of the following:
first indication information, which is used to indicate a third data packet. The third data packet includes at least one of: a data packet that needs to be transmitted and a data packet that does not need to be transmitted; where, the first indication information of the data packet that needs to be transmitted is also called "configuration information related to the transmitted data packet", and the first indication information of the data packet that does not need to be transmitted may also be called "information related to the data packet that does not need to be transmitted";
first configuration information, which is used to indicate the configuration used to transmit the data packet that needs to be transmitted, that is, to indicate the transmission configuration of the data packet that needs to be transmitted; wherein the first configuration information may also be called "configuration information related to the transmission of the data packet", that is, the information is used to indicate how to transmit the data packet that needs to be transmitted, that is, the configuration information used by these data packets;
second indication information, which is used to indicate the update of the information contained in the data packet that needs to be transmitted. The indication information may also be called "information related to the information contained in the data packet", and the indication information is used to indicate the update of the content of the data packet, that is, the indication information is used to indicate the content that needs to be updated in the data packet;

information related to the configuration information of the user terminal accessing the first node. The information may also be called "information related to the user configuration", and the information is used to configure the user (that is, the UE).

Alternatively, the above data packet that needs to be transmitted may include a data packet cached in the first node.

Alternatively, the first indication information may include information related to the transmission path of the data packet.

Alternatively, the first configuration information (configuration information related to the transmission of the data packet) may include at least one of the following:
transmission path configuration information, such as the path identification information (for example, BAP routing ID (BAP path identification information), path ID, etc.) used by the first node to transmit the data packet, the identification information of the previous node, identification information of the backhaul link channel used to receive the data packet, identification information of the next hop node, identification information of the backhaul link channel used to transmit the data packet, address information of the source node (source transmitting node), and address information of the target node (target receiving node);
for the indication information of the retained transmission configuration, the function of the information is to indicate whether the first node retains the configuration (old configuration) before the configuration is updated or the configuration before migration for data transmission, for example, the indication information for indicating to update/retain/not retain the configuration, for example, the information may include related information about the configuration that does not need to be updated. For example, the related information may be at least the following: information contained in the data packet, information related to routing, and information related to data mapping.

Indication information for releasing the transmission configuration, which is used to indicate whether the first node needs to release the configuration before the configuration update or before the migration to carry out data transmission.

Where, the above indication information for indicating to retain the transmission configuration and the indication information for indicating to release the transmission configuration may also be collectively referred to as "indication information for indicating to retain the configuration".

Alternatively, the above second indication information (information related to the information contained in the data packet) includes at least one of the following:
indication information of the information contained in the fourth data packet;
indication information of the information contained in the fifth data packet;
Wherein, the fourth data packet refers to the data packet transmitted before the migration of the node corresponding to the first node or before the update of the configuration information corresponding to the first node; the fifth data packet refers to the data packet transmitted after the node corresponding to the first node migrates or after the node configuration information corresponding to the first node is updated.

It should be noted that the node corresponding to the first node may be the first node itself, or may be an associated node of the first node, such as a child node, a parent node of the first node, etc.;

Alternatively, the above information related to the configuration information of the user terminal accessing the first node may include at least one of the following:
  configuration information of the user terminal, that is, the information used to configure the user terminal, and may also be called information for configuring the user;
  third indication information, which is used to indicate the configuration timing of the configuration information of the user terminal, that is, to indicate when to transmit the above "configuration information of the user terminal" to the user. The third indication information may also be called "indication information for indicating to delay the transmission of the user configuration information".

In order to more clearly describe each information that may be included in the third message, the information will be described in detail below. Alternatively, the above third message includes at least one of the following information:
  configuration information related to the transmitted data packet; configuration information related to the transmission of the data packet; information related to the information contained in the data packet; information related to the data packet that does not need to be transmitted; information related to the user configuration.

The above information that may be included in the third message will be described below.
  Configuration information related to the transmitted data packet, which is used to indicate which data packet needs to be transmitted by the first node. In an embodiment, the data packet may be a data packet cached by the first node. The configuration information contained in the data packet indicated by the information includes at least one of the following information:
  routing identification information, such as BAP routing ID. In an embodiment, the information includes the address information of the target receiving node (such as BAP address) and path identification information (such as path ID)
  address information of the target receiving node (such as BAP address, and/or IP address)
  path identification information (such as path ID)
  identification information of the previous hop node, such as the BAP address
  identification information of the backhaul link channel used to receive the data packet (such as ingress BH RLC channel ID). Further, the backhaul link channel is the channel on the link between the first node (such as the migrated node, or the first node a, or the first node b) and the above "previous hop node"
  identification information of the next hop node, such as the BAP address
  identification information of the backhaul link channel used to transmit the data packet (such as egress BH RLC channel ID), further, the backhaul link channel is the channel on the link between the first node and the above "next hop node"
  address information of the source node (such as BAP address, and/or IP address).
  Configuration information related to the transmission of the data packet, which indicates the configuration information used when the first node transmits the data packet. In an embodiment, the transmitted data packet is a data packet cached by the first node, further, the transmitted data packet is the data transmitted via the source path to the first node before the configuration of the first node is updated or before the first node migrates. The configuration information may be used to configure the transmission of all data packets (that is, all data packets are transmitted with the same configuration), and it may also be used to configure the transmission of different types of data packets (that is, different types of data packets use different configurations for transmission). For a configuration, the information includes at least one of the following information:
  routing identification information, such as BAP routing ID. In an embodiment, the information includes the address information of the target receiving node (such as BAP address) and path identification information (such as path ID).
  identification information of the previous hop node, such as the BAP address
  identification information of the backhaul link channel used to receive the data packet (such as ingress BH RLC channel ID). Further, the backhaul link channel is the channel on the link between the first node and the above "previous hop node"
  identification information of the next hop node, such as the BAP address
  identification information of the backhaul link channel used to transmit the data packet (such as egress BH RLC channel ID), further, the backhaul link channel is the channel on the link between the first node and the above "next hop node"
  address information of the source node, such as source IP address information, source BAP address information
  address information of the target node (that is, the target receiving node), such as target IP address information, target BAP address information
  indication information for indicating to retain the configuration, the function of the information is to indicate whether the first node retains the configuration (old configuration) before the configuration update or retains the configuration before the migration in order to carry out the data transmission, for example, the configuration (for example, BAP configuration) indicating to retain, or not retain (or release), need to retain (or not retain, or release) includes at least one of the following configurations:
  information contained in the data packet, which includes at least one of the following information:
    routing identification information, such as BAP routing ID, in an embodiment, the information includes the address information of the target receiving node (such as BAP address) and path identification information (such as path ID)
    address information of the target receiving node (such as BAP address, and/or IP address)
    path identification information (such as path ID)
    address information of the source node (such as BAP address, and/or IP address)
  information related to routing, which indicates routing information of the data packet at the first node, and the information includes at least one of the following information:
    routing identification information, such as BAP routing ID, in an embodiment, the information includes address information of the target receiving node (such as BAP address) and path identification information (such as path ID)

address information of the target receiving node (such as BAP address)

path identification information (such as path ID)

identification information of the next hop node, such as the BAP address information related to data mapping, which indicates the mapping information used for data packet transmission at the first node. The function of the mapping information is to indicate how to map the data on the node receiving channel to the transmitting channel, for example, for a node, the function of the mapping information may be to indicate how the node transmits the received data packet, and the information includes at least one of the following information:

identification information of the previous hop node (for example, the node A transmits a data packet and the node B receives the data packet, then the node A is the previous hop node corresponding to the node B), such as BAP address, IP address, etc.;

identification information of the backhaul link channel used to receive the data packet (such as ingress BH RLC channel ID). Further, alternatively, the backhaul link channel may be a channel on the link between the first node and the above "previous hop node".

identification information of the next hop node (for example, if the node A needs to transmit a data packet to node B, then the node B is the next hop node of the node A), such as the BAP address and/or IP address, etc.;

identification information of the backhaul link channel used to transmit the data packet (such as egress BH RLC channel ID (identifier of the backhaul link radio link layer control protocol channel for transmitting the data packet)). Further, alternatively, the backhaul link channel is the channel on the link between the first node and the above "next hop node".

information related to the information contained in the data packet, which indicates the update of the information contained in the data packet, and the information includes at least one of the following information:

address identification information old routing identification information, such as BAP routing ID, in an embodiment, the information includes the address of the target node (such as the BAP address) and path identification information new routing identification information, such as BAP routing ID. In an embodiment, the information includes the address of the target node (such as the BAP address) and path identification information old source address (source transmitting address) information, such as IP address new source address information, such as IP address old target address information, such as IP address new target address information, such as IP address Wherein, in the above information, the old information (such as the old routing identification information, the old source address information, the old target address information) is the information contained in the data packet before the configuration update or before the migration of the first node, and the new information (such as new routing identification information, new source address information, and new target address information) is the information contained in the data packet after the configuration update of the first node or after the migration. The first node may determine the information contained in the data packet that needs to be transmitted based on the information contained in the information. If the information related to the information contained in the data packet includes old information and new information, the first node may replace the information corresponding to the old information contained in the data packet with the corresponding new information, for example, the first node updates the old routing identification information contained in the data packet to the new routing identification information.

information related to the data packet that does not need to be transmitted. The information indicates the data packet that does not need to be transmitted by the first node, or indicates the data packet that needs to be discarded by the first node. The information includes at least one of the following information:

indication information of the node that has not been migrated (or the configuration has not been updated), such as the BAP address, IP address, the identification information of the relay node, the identification information of the distributed unit function part of the relay node (such as gNB-DU ID), etc. In an embodiment, if the target receiving node of the data packet is the node indicated by the indication information, then these data packets do not need to be transmitted.

indication information of a discardable packet (or a data packet that does not need to be transmitted), which includes at least one of the following information:

routing identification information, such as BAP routing ID. In an embodiment, the information includes the address of the target node (such as BAP address) and path identification information. Correspondingly, if the routing identification information is included, the data packet corresponding to the routing identification information may be discarded;

identification information of the target receiving node, such as the BAP address, that is, the data packet corresponding to the identification information may be discarded.

path identification information, such as Path ID, that is, the data packet corresponding to the routing identification information may be discarded.

information related to the user configuration. The function of the information is to configure the user. The user is the user accessing the first node. The user may be an ordinary user without the relay function or a relay node with the relay function (that is, the child node of the first node, or the child node of the child node of the first node). The information includes at least one of the following information:

information for configuring the user. The information may be the information contained in the RRC message. In an embodiment, the information contains an RRC message (such as an RRC Reconfiguration message). The RRC message is used to configure the user accessing the first node, thus it will be finally transmitted to the user by the first node; further, the information may also include indication information for indicating to delay the execution of the configuration contained in the information. After receiving the indication information, the user will not execute configuration contained in the information immediately after receiving the information for configuring the user, but will execute after certain conditions are met (for example, the first node informs the user to execute).

indication information for indicating to delay the transmission of the user configuration message. The function of the information is to inform the first node to delay transmitting the above "information for configuring the user" to the user. Wherein, after the first node receives the information, in an embodiment, the first node transmits all the data packets it caches to the user and then transmits the above "information for configuring the user". In an example, the cached data packet may be the data packet received before the configuration update or before the migration of the first node. In another example, the cached data packet may be the data packet indicated by the above "configuration information related to the transmitted data packet". In the actual system, the user may update its security-related configuration (such as the security key) after receiving the above "information for configuring the user", but the security configuration used by the data packet cached by the first node is the configuration before the configuration update of the first node or before the migration of the first node. In order to ensure that the user may correctly receive these data packets, the user needs to use the configuration before the configuration update of the first node or before the migration of the first node. Therefore, the function of the indication information for indicating to delay transmitting the user configuration message is to help the user correctly receive the data packet cached before the configuration update of the first node or before the migration of the first node. In another embodiment, when the above "information for configuring the user" is used to configure the child node of the first node, the function of the above "indication information for indicating to delay transmitting the user configuration information" is that the first node will transmit the above "information for configuring the user" to the child node after receiving the RRC message for configuring the first node (such as the RRCReconfiguration message, the RRC message is used to configure the mobile terminal of the first node, and the RRC message is transmitted by the second node to the mobile terminal of the first node via the parent node of the first node). In this embodiment, the beneficial effect of delaying transmitting the RRC message for configuring the child node is that: the update configuration time of the first node and the update configuration time of its child node are similar, which may ensure that the time for the first node performing the configuration update and the time for the child node performing the configuration update is similar, thereby reducing the continuity of data transmission by the first node and its child node and avoiding long interruptions time.

In an optional embodiment of the disclosure, the communication method may further include:

Step 2-2 (optional step): receive the response message of the third message (also called a first data configuration response message). The function of this message is to confirm that the configuration in step 2-1 is completed.

With the first node as the execution subject, the corresponding description of step 2-2 is: transmitting a response message to the third message.

Alternatively, after receiving the above third message transmitted by the second node, the first node may also transmit a first data configuration response message to the second node to confirm that the configuration in step 2-1 is completed, that is, the first node performs corresponding configuration/processing based on the above third message.

Alternatively, the communication method may further include:

Step 2-3: the first node performs corresponding processing according to the third message, that is, the first node transmits user data (data packet) according to the configuration in step 2-1, that is, the user data transmission shown in the figure.

Based on the optional embodiments provided in the second aspect of the disclosure, the relay node (the first node) may determine a transmission method for configuring the data packet received before the configuration update or before the migration based on the third message transmitted by the second node and transmit these data packets to the target node.

In the above process, the specific messages of the first data configuration message (the third message) and the first data configuration response message (the fourth message) are not limited in the embodiment of the disclosure. For example, it may be an F1AP messages (such as UE Context Modification Request/Response messages), or may be an RRC messages (such as RRCReconfiguration and RRCReconfigurationComplete messages), or may be other messages.

It is understandable that the above step 2-1 is described with the second node as the execution subject, and the first node may also be described as the execution subject. In this case, the communication method may include: receiving a third message, wherein the third message is used by the first node to configure transmission of a user data packet; transmitting the user data packet based on the third message.

Alternatively, the communication method may further include: transmitting a response message of the third message to determine that the corresponding configuration is completed according to the third message.

In each of the optional embodiments provided in the second aspect of the disclosure, in the above process, for different data packet transmission methods, there may be different implementation manners as follows. In order to better explain the solution provided by the second aspect of the disclosure, the solution will be described below in conjunction with several optional embodiments. It is understandable that the following description are optional implementations of the solution of the disclosure. It should not be construed as a limitation on the solution of the disclosure.

Embodiment 1: the configuration before the configuration update or the configuration before the migration is completely used for data packet transmission. This embodiment may include the following steps:

Step 2-1-1: the second node transmits a data configuration message 1 (an optional solution of the third message) to the first node. The function of this message is to configure the transmission of user data. The message includes at least one of the following information:

first configuration information related to the transmitted data packet. For the content contained in the information, please refer to the "configuration information related to the transmitted data packet" in above step 2-1 first configuration information related to the transmission of the data packet, which contains "indication information for indicating to retain the configuration" (the configuration that needs to be retained indicated by the information may refer to the "indication information for indicating to retain the configuration" in above step 2-1)

first information related to the data packet that does not need to be transmitted. For the content contained in the information, please refer to "information related to the data packet that does not need to be transmitted" in above step 2-1.

first information related to the user configuration. For the content contained in the information, please refer to "information related to the user configuration" in above step 2-1

Step 2-1-2: the first node transmits user data according to the configuration in step 2-1-1. For example, the first node will transmit the data packet cached before the configuration update or before the migration still according to the original configuration.

Based on Embodiment 1, the first node may transmit its cached data packet according to the configuration of the second node. Alternatively, the data packet cached by the first node may be the data packet cached by the first node described in the optional embodiment of the first aspect of the disclosure.

Embodiment 2: the configuration before the configuration update or before the migration is completely used for data packet transmission, and the information contained in the data packet changes (for example, the source IP address changes). This embodiment may include the following steps:

Step 2-2-1: the second node transmits a data configuration message 2 (an optional solution of the third message) to the first node. The function of this message is to configure the transmission of user data. The message includes at least one of the following information:

second configuration information related to the transmitted data packet. For the content contained in the information, please refer to the "configuration information related to the transmitted data packet" in above step 2-1.

second configuration information related to the transmission of the data packet, which contains "indication information for indicating to retain the configuration" (for the configuration that needs to be retained indicated by the information, please refer to the "indication information for indicating to retain the configuration" in above step 2-1)

first information related to the information contained in the data packet. For the information contained in the information, please refer to "information related to the information contained in the data packet" in above step 2-1 second information related to the data packet that does not need to be transmitted. For the content contained in the information, please refer to the "information related to the data packet that does not need to be transmitted" in above step 2-1 second information related to the user configuration. For the content contained in the information, please refer to the "information related to the user configuration" in above step 2-1

Step 2-2-2: the first node transmits user data according to the configuration in step 2-2-1. For example, the first node will transmit the data packet cached before the configuration update or before the migration still according to the original configuration, further, when the first node transmits these data packets, it will change the information contained in the data packets (for the information that needs to be modified, please refer to the "first information related to the information contained in the data packet" in above step 2-2-1, in an example, the modified information is the source IP address).

Embodiment 3: the new configuration is completely used for data packet transmission, and all cached data packets are transmitted with the same new configuration, and the information contained in the data packet does not change. This embodiment may include the following steps:

Step 2-3-1: the second node transmits a data configuration message 3 (an optional solution of the third message) to the first node. The function of this message is to configure the transmission of user data. The message includes at least one of the following information:

third configuration information related to the transmitted data packet. For the content contained in the information, please refer to the "configuration information related to the transmitted data packet" in above step 2-1 third configuration information related to the transmission of the data packet, which does not contain "indication information for indicating to retain the configuration" (for the configuration that needs to be retained indicated by the information, please refer to the "indication information for indicating to retain the configuration" in above step 2-1). In an embodiment, the information contained in the information may be used to configure the transmission of all cached data packets. In another embodiment, the information contained in the information may be used to configure to transmit the data packet indicated by the above "third configuration information related to the transmitted data packet"

third information related to the data packet that does not need to be transmitted. For the content contained in the information, please refer to the "information related to the data packet that does not need to be transmitted" in above step 2-1.

third information related to the user configuration. For the content contained in the information, please refer to the "information related to the user configuration" in above step 2-1

Step 2-3-2: the first node transmits user data according to the configuration in step 2-3-1. For example, the first node uses the configuration in step 2-3-1 to transmit the data packet cached before the configuration update or before the migration. The configuration in step 2-3-1 is used to transmit all cached data packets or the data packet indicated by the "third configuration information related to the transmitted data packet" in step 2-3-1. Further, when the first node transmits these data packets, it does not change the information contained in the data packet.

Embodiment 4: the new configuration is completely used for data packet transmission, and different cached data packets are transmitted with different new configurations, and the information contained in the data packet does not change. This embodiment may include the following steps:

Step 2-4-1: the second node transmits a data configuration message 4 to the first node. The function of this message is to configure the transmission of the user data. The message includes at least one of the following information:

fourth configuration information related to the transmitted data packet. For the content contained in the information, please refer to the "configuration information related to the transmitted data packet" in above step 2-1 fourth configuration information related to the transmission of the data packet, which does not contain "indication information for indicating to retain the configuration" (for the configuration that needs to be retained indicated by the information, please refer to the "indication information for indicating to retain the configuration" in above step 2-1). In an embodiment, the information may include a variety of new configuration information, and each new configuration information is used to transmit one type of data packet fourth information related to the data packet that does not need to be transmitted. For the content contained in the information, please refer to the "information related to the data packet that does not need to be transmitted" in above step 2-1 fourth information related to the user configuration. For the content contained in the information, please refer to the "information related to the user configuration" in above step 2-1

Step 2-4-2: the first node transmits the user data according to the configuration in step 2-4-1. For example, the first node uses the configuration in step 2-4-1 to transmit the data packet cached before the configuration update or before the migration, and different types of data packets will be transmitted with different configurations. Further, when the first node transmits these data packets, it does not change the information contained in the data packets.

Embodiment 5: the new configuration is completely used for data packet transmission, and all cached data packets are transmitted with the same new configuration, and the information contained in the data packet changes. This embodiment may include the following steps:

Step 2-5-1: the second node transmits a data configuration message 5 (an optional solution of the third message) to the first node. The function of this message is to configure the transmission of user data. The message includes at least one of the following information:

fifth configuration information related to the transmitted data packet. For the content contained in the information, please refer to the "configuration information related to the transmitted data packet" in above step 2-1 fifth configuration information related to the transmission of the data packet, which does not contain the "indication information for indicating to retain the configuration" (for the configuration that needs to be retained indicated by the information, please refer to the "indication information for indicating to retain the configuration" in above step 2-1), the information contained in the information may be used to configure the transmission of all cached data packets. In another embodiment, the information contained in the information may be used to configure the transmission of the data packet indicated by the above "third configuration information related to the transmitted data packet".

second information related to the information contained in the data packet. For the information contained in the information, please refer to the "information related to the information contained in the data packet" in above step 2-1 fifth information related to the data packet that does not need to be transmitted. For the content contained in the information, please refer to "information related to the data packet that does not need to be transmitted" in above step 2-1.

fifth information related to the user configuration. For the content contained in the information, please refer to "information related to the user configuration" in above step 2-1

Step 2-5-2: the first node transmits the user data according to the configuration in step 2-5-1. For example, the first node uses the configuration in step 2-5-1 to transmit the data packets cached before the configuration update or before the migration. The configuration in step 2-5-1 is used to transmit all cached data packets or the data packet indicated by the "third configuration information related to the transmitted data packet" in step 2-5-1. Further, when the first node transmits these data packets, it will change the information contained in the data packets (for the information that needs to be modified, please refer to the "second information related to the information contained in the data packet" in above step 2-5-1).

Embodiment 6: the new configuration is completely used for data packet transmission, and different cached data packets are transmitted with different new configurations, and the information contained in the data packet changes. This embodiment may include the following steps:

Step 2-6-1: the second node transmits a data configuration message 6 (an optional solution of the third message) to the first node. The function of this message is to configure the transmission of user data. The message includes at least one of the following information:

sixth configuration information related to the transmitted data packet. For the content contained in the information, please refer to the "configuration information related to the transmitted data packet" in above step 2-1 sixth configuration information related to the transmission of the data packet, which does not contain "indication information for indicating to retain the configuration" (for the configuration that needs to be retained indicated by the information, please refer to the "indication information for indicating to retain the configuration" in above step 2-1). In an embodiment, the information may include a variety of new configuration information, and each new configuration information is used to transmit one type of data packet third information related to the information contained in the data packet. For the information contained in the information, please refer to "information related to the information contained in the data packet" in above step 2-1.

sixth information related to the data packet that does not need to be transmitted. For the content contained in the information, please refer to "information related to the data packet that does not need to be transmitted" in above step 2-1.

sixth information related to the user configuration. For the content contained in the information, please refer to the "information related to the user configuration" in above step 2-1

Step 2-6-2: the first node transmits the user data according to the configuration in step 2-6-1. For example, the first node uses the configuration in step 2-6-1 to transmit the data packets cached before the configuration update or before the migration, and different types of data packets will be transmitted with different configurations. Further, when the first node transmits these data packets, it will change the information contained in the data packets (for the information that needs to be modified, please refer to the "third information related to the information contained in the data packet" in above step 2-6-1).

Another technical problem of this aspect is that: when the parent node of a relay node changes, the network side performs relevant configuration updates on the relay node or its child node, and these updates will involve data transmission from that relay node or its child node, which introduces a lot of signaling overhead to the network, and increases the burden on the network.

Figure 6B:
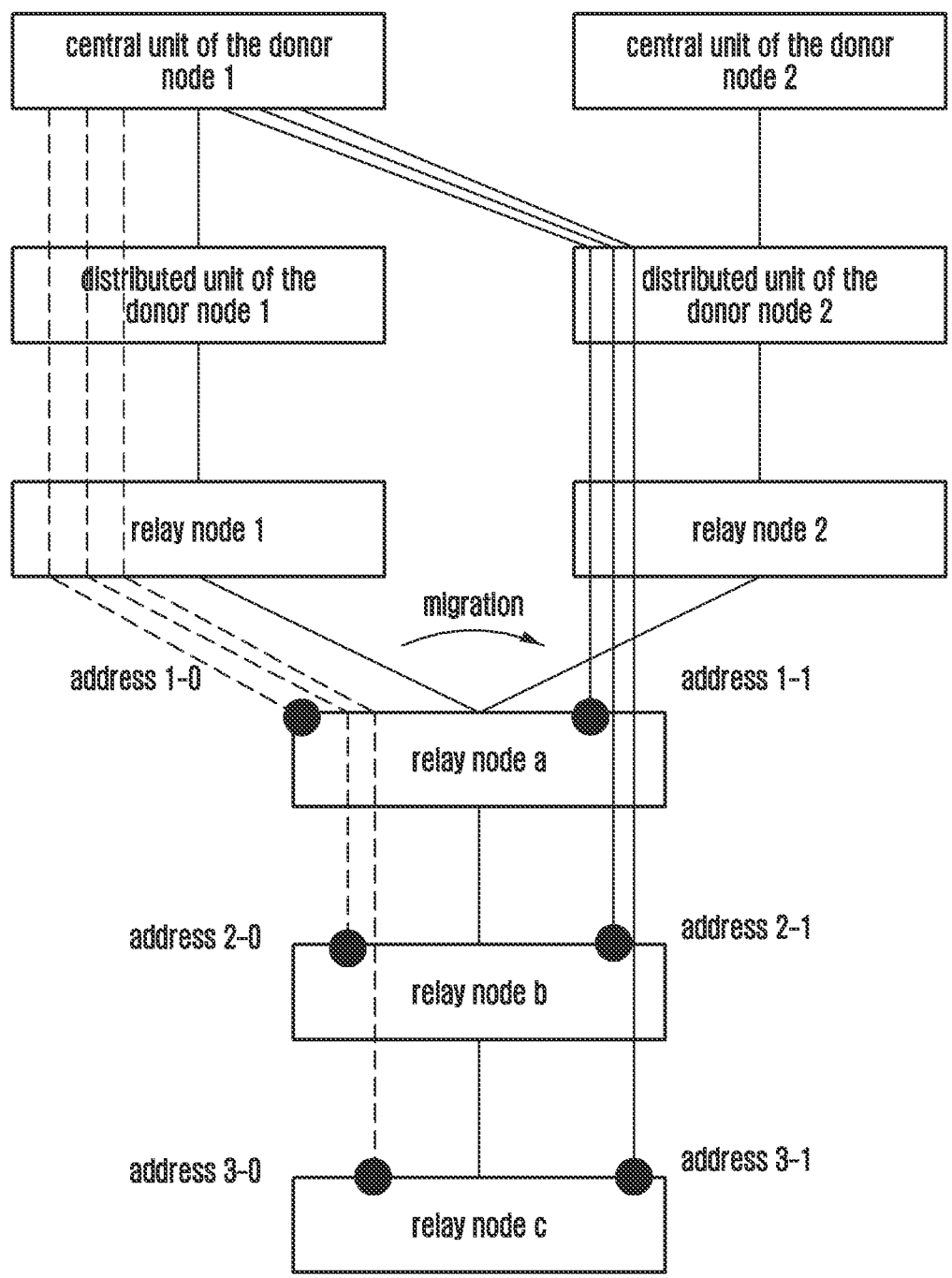
FIG. 6B is an example of a communication method according to various embodiments of the disclosure.
Figure 6C:
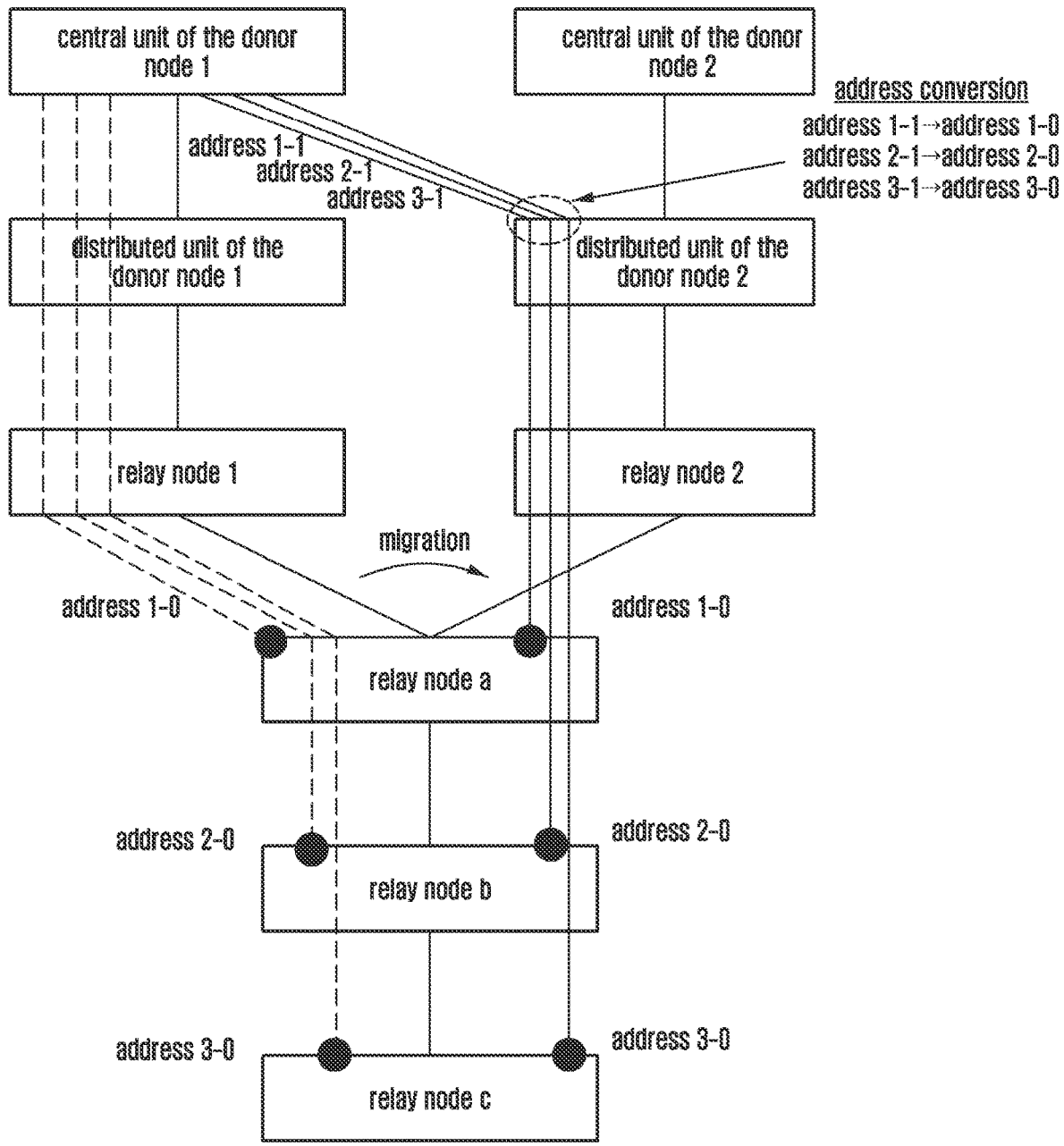
FIG. 6C is an example of a communication method according to various embodiments of the disclosure.

FIGS. 6B and 6C are examples of a communication method according to various embodiments of the disclosure.

FIG. 6B illustrates, as an example, a specific explanation of this technical problem according to an embodiment of the disclosure. Referring to FIG. 6B, the relay node's parent node changes (e.g., changes from relay node 1 to relay node 2, where relay node 1 and relay node 2 are connected to the central unit of donor node 1 and the central unit of donor node 2, respectively), which causes the data transmission between the central unit of donor node 1 and relay node a/b/c (or the distributed unit part of relay node a/b/c) change. Before the migration, the nodes through which the central unit of donor node 1 sends data to the relay node a/b/c (the nodes on the path shown by dashed lines in FIG. 6B) are the distributed unit of donor node 1 and relay node 1, respectively, then the addresses used at the relay node a/b/c are addresses 1-0/2-0/3-0 (old address information, as an example, which can be IP addresses); after the migration, the nodes (the nodes on the path shown by the solid line in FIG. 6B) that the central unit of donor node 1 passes through when sending data to relay nodes a/b/c are the distributed unit of donor node 2 and relay node 2, respectively, then the addresses used at relay nodes a/b/c are addresses 1-1/2-1/3-1 (new address information, as an example, which can be IP addresses). The address needs to be changed since the distributed unit of the donor node in the transmission link is changed to the distributed unit of donor node 2, and the relay node accessing this distributed unit needs to use a different address than the relay node accessing the distributed unit of donor node 1 (the updated address ensures that the data sent from the central unit of donor node 1 can be routed to the distributed unit of donor node 2 first). According to the traditional method, in order to ensure the continuation of data transmission after the migration, the central unit of donor node 1 or the central unit of donor node 2 needs to update the address information of relay node a/b/c by signaling, in addition, other configuration updates (such as configuration updates of the routing, configuration updates of bearer mapping, etc.) are also required, which inevitably introduces more signaling overhead. At least one technical problem solved by the disclosure is to reduce these signaling overheads, even when one or more of the relay nodes a/b/c do not need to perform the configuration updates after migration (i.e., continuously use the configuration before migration to continuously perform the data transmission with the central unit of donor node 1).

Referring to FIG. 6C, the scheme of the disclosure solving the above technical problem. The central unit of donor node 1 still uses the new address when sending data to relay nodes a/b/c (e.g., address 1-1/2-1/3-1, corresponding to an example in the first related information later), and when the data is routed to the distributed unit of donor node 2, the distributed unit of donor node 2 updates the destination address of the data packet (e.g., the data packet whose destination address is address 1-1/2-1/3-1 is updated to address 1-0/2-0/3-0, respectively (corresponding to an example of the second related information later)), so that relay nodes a/b/c can continue to follow the address used before migration for data packet reception, as shown in the solid line part in FIG. 6C, and the distributed unit of donor node 2 performs address conversion of the received data packet, changes the destination address of the data packet from the new address 1-1/2-1/3-1 to the old address 1-0/2-0/3-0, respectively. According to this solution, it requires to perform signaling interaction between nodes, but it does not need to perform configuration update for one or more of relay nodes a/b/c, as shown in the interaction flow corresponding to the dashed portion on the right in FIG. 6C, and no configuration update is required in relay nodes a/b/c.

Figure 6D:
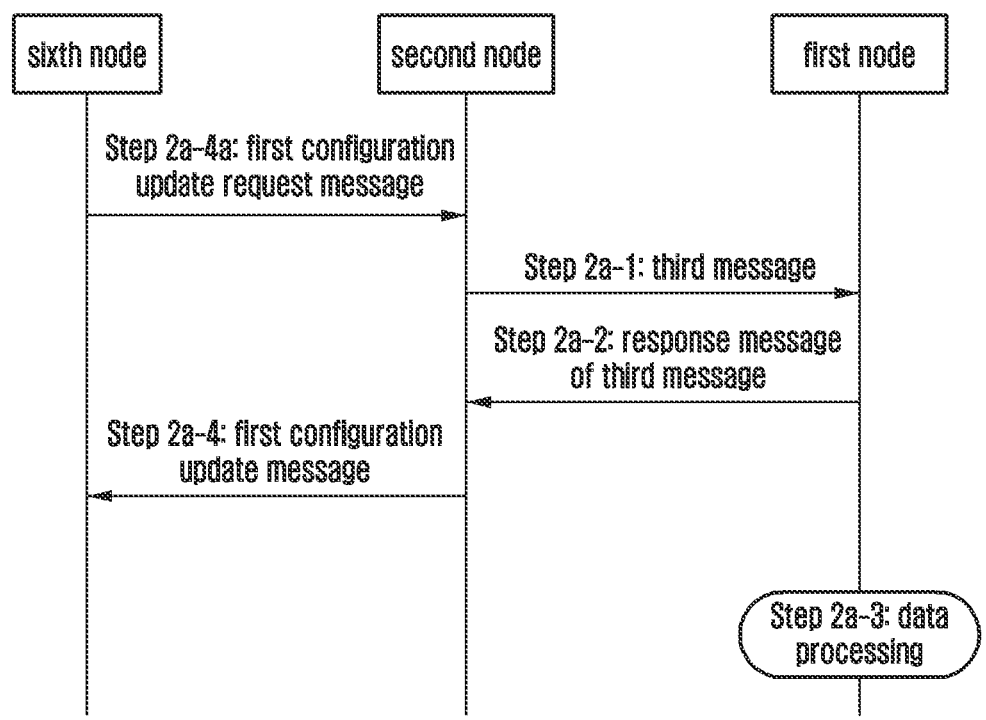
FIG. 6D is example 1 of a flowchart of a communication method according to an embodiment of the disclosure.

FIG. 6D is example 1 of a flowchart of a communication method according to an embodiment of the disclosure.

Referring to FIG. 6D, The processes involved in the above method can follow the above steps 2-1, step 2-2 (optional step), step 2-3, and specifically, the processes involved may include:

Step 2a-1: the second node sends a third message (which may also be referred to as a first data configuration message or other name) to the first node, for example, which is a central unit of the donor node or a control plane part of a central unit of the donor node, or a user plane part of a central unit of the donor node, and the first node is a distributed unit of the donor node. This third message is used to configure the first node for transmission of a data packet that is sent to a relay node (or a distributed unit of the relay node), i.e., the destination address of the data packet is the address of the relay node, for example, which may be the migrated node or a child node of the migrated relay node (the child node may be directly connected to the migrated relay node or may be connected to the migrated relay node through one or more nodes), and this third message may include at least one of the following information:

Configuration information related to the transmitted data packet, the contents contained in the information can be referred in the description of the above step 2-1 configuration information related to the transmission of the data packet, the contents contained in the information can be referred in the description of the above step 2-1, the "information related to the information contained in the data packet" included in this information can be used to indicate the update of the information contained in the data packet, which includes at least one of the following information:

address identification information first routing identification information, such as BAP routing ID, which includes the address of the destination node (e.g., BAP address) and path identification information in an embodiment second routing identification information, such as BAP routing ID, which includes the address of the destination node (e.g., BAP address) and path identification information in an embodiment first source address (source transmitting address) information, such as IP address second source address information, such as IP address first destination address information, such as IP address second destination address information, such as IP address Among the above information, the first related information (e.g., first routing identification information, first source address information, first destination address information, e.g., address 1-1/2-1/3-1 in the preceding) is the information contained in the data packet received by the first node, and the second related information (e.g., second routing identification information, second source address information, second destination address information, e.g., address 1-0/2-0/3-0 in the preceding) is the information contained in the data packet sent by the first node. The first node can update the data packet based on the information contained in the information, such as if the above information related to the information contained in the data packet includes the first related information and the second related information, then the first node can replace the information contained in the data packet corresponding to the first related information with the corresponding second related information, such as update the first routing identification information contained in the data packet to the second routing identification information, update the first destination address information contained in the data packet to the second destination address information, and update the first source address information contained in the data packet to the second source address information. The beneficial effect of receiving the above information is that: the first node can update the information of the data packets it receives, thus ensuring that these updated data packets can be received by the relay nodes, and these relay nodes do not need to perform configuration updates when receiving data packets, thereby reducing the signaling overhead due to the configuration of the relay nodes.

Other information, which can be referred in the information described in above step 2-1.

Step 2a-2 (optional step): the first node sends a response message of the third message to the second node (which may also be referred to as a first data configuration response message), which serves to confirm the completion of the configuration in step 2a-1. In addition, when only the second related information is contained in the above third message, the response message of the above third message may also include at least one of the following information:
  address identification information
  first routing identification information, such as BAP routing ID, which includes the address of the destination node (e.g., BAP address) and path identification information in an embodiment
  second routing identification information, such as BAP routing ID, which includes the address of the destination node (e.g., BAP address) and path identification information in an embodiment
  first source address (source transmitting address) information, such as IP address
  second source address information, such as IP address
  first destination address information, such as IP address
  second destination address information, such as IP address The above second related information is received by step 2a-1, and the first related information is the information required by other nodes (such as the sixth node below) to make data transmission. Thus, the data packet received by the first node will include the above-mentioned first related information, and the first node will update the first related information contained in the data packet to the above-mentioned second related information.

When the above step 2a-1 includes the second related information and step 2a-2 includes the first related information, the above process helps the first node to determine the information update for the received data packets. If the first node receives a data packet containing the above-mentioned first related information, it updates the first related information to the second related information. This has at least the following beneficial effect that: the data packet information is updated by the first node, thereby ensuring that these updated data packets can be received by relay nodes, and that these relay nodes do not need to perform configuration updates when receiving data packets, thereby reducing the signaling overhead due to the configuration of relay nodes.

Step 2a-3: the first node performs the corresponding processing (i.e., data processing in FIG. 6D) according to the third message and/or the response message of the third message, i.e., the first node performs the transmission of user data (data packets) according to the configuration in step 2a-1 and/or step 2a-2, such as updating the information in the received data packets according to the configuration in step 2a-1/or step 2a-2.

Further, when the second node is donor node 2 (or a central unit of donor node 2, or a control-plane part of a central unit of donor node 2) in FIG. 6C, the above process may further include that: the second node sends an address update message to donor node 1 (or a central unit of donor node 1, or a control-plane part of a central unit of donor node 1, or a user-plane part of a central unit of donor node 1) in the figure. The information serves to inform the donor node 1 (or the central unit of donor node 1, or the control-plane part of the central unit of donor node 1, or the user-plane part of the central unit of donor node 1) to use the updated information for data transmission. Specifically, it further includes the steps of:

Step 2a-4: (this step may follow above step 2a-2) the second node sends a first configuration update message to the sixth node, the message serves to inform the sixth node of the information required to perform the data transmission. This second node and the sixth node are two different donor nodes (or central units of the donor node, or control-plane parts of central units of the donor node, or user-plane parts of central units of the donor node), and the sixth node sends data to a relay node (which can be the migrated node or a child node of the migrated node), and the second node controls the distributed unit of the donor node that receives the data sent by the sixth node. In an embodiment, as shown in FIG. 6C, this second node is a central unit of donor node 2 (or a control-plane part of a central unit of donor node 2, or a user-plane part of a central unit of donor node 2), and the sixth node is a central unit of donor node 1 (or a control-plane part of a central unit of donor node 1, or a user-plane part of a central unit of donor node 1). The first configuration update message includes at least one of the following information:
  address identification information
  second routing identification information, such as BAP routing ID, which includes the address of the destination node (e.g., BAP address) and path identification information in an embodiment
  first routing identification information, such as BAP routing ID, which includes the address of the destination node (e.g., BAP address) and path identification information in an embodiment
  second source address (source transmitting address) information, such as IP address
  first source address information, such as IP address
  second destination address information, such as IP address
  first destination address information, such as IP address Upon receipt of the above information, the sixth node may transmit data packets using the above first routing identification information and/or the first source address information and/or the first destination address information, which were transmitted by using the above second routing identification information and/or the second source address information and/or the second destination address information prior to receipt of the above information, and upon receipt of the above new information, the sixth node then uses the above-mentioned first related information for data packet transmission.

Steps 2a-4 may be preceded by steps 2a-4a, wherein the sixth node sends a first configuration update request message to the second node, the message serves to provide the second node with information used for data packet transmission, the message including at least one of the following information:
  address identification information
  second routing identification information, such as BAP routing ID, which includes the address of the destination node (e.g., BAP address) and path identification information in an embodiment second source address (source transmitting address) information, such as IP address second destination address information, such as IP address The above information is the information used in the data packet when the sixth node sends data to the relay node (which can be either the migrated node or a child node of the migrated node).

In an embodiment, steps 2*a*-1 and/or steps 2*a*-2 and/or 2*a*-4*a* and/or steps 2*a*-4 described above may be performed individually or in combination with each other.

The third message in the above process, the response message of the third message, the first configuration update message, and the first configuration update request message can be an F1 message or an Xn message, or can be an existing message or a new message.

The beneficial effect of the above process lies in that: the signaling interaction between the central unit of the donor node (the control-plane part of the central unit of the donor node, or the user-plane part of the central unit of the donor node) and the distributed unit, and/or the signaling interaction between the donor node (the central unit of the donor node, or the control-plane part of the central unit of the donor node, or the user-plane part of the central unit of the donor node), enables the distributed unit of the donor node processing of data packets, thereby ensuring that these updated data packets can be received by relay nodes (or distributed units of relay nodes), and these relay nodes (or distributed units of relay nodes) receive data packets without configuration updates, thereby reducing the signaling overhead due to configuration of relay nodes. In an example, the aforementioned relay node (or a distribution unit of the relay node) may be the migrated node or may be a child node of the migrated relay node (the child node may be directly connected to the migrated relay node or may be connected to the migrated relay node through one or more nodes).

Optional embodiments of the above process are given below in conjunction with the example in FIG. 6C, i.e., Embodiment 7 and Embodiment 8 below.

Figure 6E:
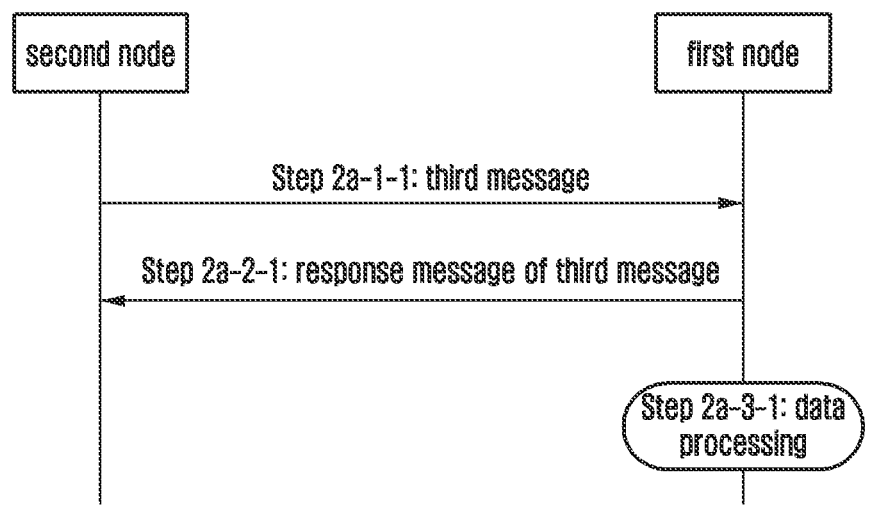
FIG. 6E is example 2 of a flowchart of a communication method according to an embodiment of the disclosure.

FIG. 6E is example 2 of a flowchart of a communication method according to an embodiment of the disclosure.

Embodiment 7, the second node informs the first node of performing the address update of the data packet, as shown in FIG. 6E, and may include the steps of:

Step 2*a*-1-1: the second node sends a third message to the first node, and the third message includes at least one of the following messages:
  address identification information
  first routing identification information, such as BAP routing ID, which in one embodiment includes the address of the destination node (e.g., BAP address) and path identification information, which in FIG. 6C, for example, can be address 1-1/2-1/3-1
  second routing identification information, such as BAP routing ID, which includes the address of the destination node (e.g., BAP address) and path identification information in an embodiment, taking FIG. 6C as an example, it can be address 1-0/2-0/3-0
  first source address (source transmitting address) information, such as IP address, taking FIG. 6C as an example, it can be address 1-1/2-1/3-1
  second source address information, such as IP address, taking FIG. 6C as an example, it can be address 1-0/2-0/3-0
  first destination address information, such as IP address, taking FIG. 6C as an example, it can be address 1-1/2-1/3-1
  second destination address information, such as IP address, taking FIG. 6C as an example, it can be address 1-0/2-0/3-0

Step 2*a*-2-1: the first node sends a response message of the third message to the second node Step 2*a*-3-1: the first node performs information processing of the received data packet according to the third message (i.e., data processing in FIG. 6E), and as shown in FIG. 6C, the first node updates the address 1-1/2-1/3-1 contained in the received data packet to address 1-0/2-0/3-0.

Figure 6F:
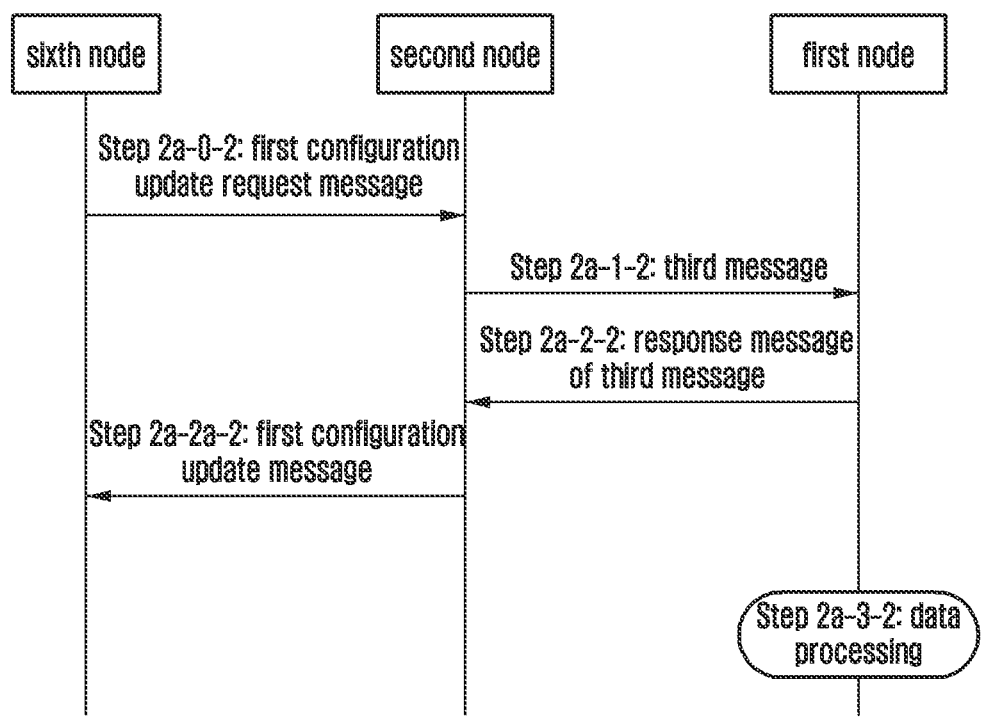
FIG. 6F is example 3 of a flowchart of a communication method according to an embodiment of the disclosure.

FIG. 6F is example 3 of a flowchart of a communication method according to an embodiment of the disclosure.

Embodiment 8, the second node informs the first node of the information contained in the data packet, and the first node informs the second node of the first related information required for the transmission of the data packet. As shown in FIG. 6F, this embodiment includes the following steps:

Step 2*a*-1-2: the second node sends a third message to the first node, and the third message includes at least one of the following messages:
  address identification information
  second routing identification information, such as BAP routing ID, which includes the address of the destination node (e.g., BAP address) and path identification information in an embodiment, taking FIG. 6C) as an example, it can be address 1-0/2-0/3-0
  second source address (source transmitting address) information, such as IP address, taking FIG. 6C as an example, it can be address 1-0/2-0/3-0
  second destination address information, such as IP address, taking FIG. 6C as an example, it can be address 1-0/2-0/3-0

Step 2*a*-2-2: the first node sends a response message of the third message, and the response message includes one of the following information:
  address identification information
  second routing identification information, such as BAP routing ID, which includes the address of the destination node (e.g., BAP address) and path identification information in an embodiment, taking FIG. 6C as an example, it can be address 1-0/2-0/3-0
  first routing identification information, such as BAP routing ID, which includes the address of the destination node (e.g., BAP address) and path identification information in an embodiment, taking FIG. 6C as an example, it can be address 1-1/2-1/3-1
  second source address (source transmitting address) information, such as IP address, taking FIG. 6C as example, it can be address 1-0/2-0/3-0
  first source address information, such as IP address, taking FIG. 6C as an example, it can be address 1-1/2-1/3-1
  second destination address information, such as IP address, taking FIG. 6C as example, it can be address 1-0/2-0/3-0
  first destination address information, such as IP address, taking FIG. 6C as example, it can be address 1-1/2-1/3-1

Step 2*a*-3-2: the first node performs information processing of the received data packets according to the third message and/or the response message of the third message (i.e., data processing in FIG. 6F). The data packets received by the first node may include the new information (i.e., first related information, such as address 1-1/2-1/3-1) from step 2*a*-2-2 above, then the first node will update the new information contained in these data packets to the old information (i.e., second related information). As shown in FIG. 6C, the first node will update the addresses 1-1/2-1/3-1 contained in the received data packets to addresses 1-0/2-0/3-0, respectively.

Further, the above steps 2a-1-2 are preceded by steps 2a-0-2, that is:

Step 2a-0-2: the sixth node sends a first configuration update request message to the second node, and the contents contained in this message can be found in steps 2a-4a above. The role of this message can be used to inform the relay node of the configuration information used in transmitting the data. Specifically, the message includes at least one of the following information:

address identification information second routing identification information, such as BAP routing ID, which includes the address of the destination node (e.g., BAP address) and path identification information in an embodiment, taking FIG. 6C as an example, it can be address 1-0/2-0/3-0 second source address (source transmitting address) information, such as IP address, taking FIG. 6C as an example, it can be address 1-0/2-0/3-0 second destination address information, such as IP address, taking FIG. 6C as an example, it can be address 1-0/2-0/3-0

Step 2a-2-2 may be followed by step 2a-2a-2, in which the second node sends a first configuration update message to the sixth node, the message serves to inform the sixth node of the information required to perform the data transmission, which can be seen in steps 2a-4 above. Specifically, the message includes at least one of the following information:

address identification information second routing identification information, such as BAP routing ID, which includes the address of the destination node (e.g., BAP address) and path identification information in an embodiment, taking FIG. 6C as an example, it can be address 1-0/2-0/3-0 first routing identification information, such as BAP routing ID, which includes the address of the destination node (e.g., BAP address) and path identification information in an embodiment, taking FIG. 6C as an example, it can be address 1-1/2-1/3-1 second source address (source transmitting address) information, such as IP address, taking FIG. 6C as an example, it can be address 1-0/2-0/3-0 first source address information, such as IP address, taking FIG. 6C as an example, it can be address 1-1/2-1/3-1 second destination address information, such as IP address, taking FIG. 6C as an example, it can be address 1-0/2-0/3-0 first destination address information, such as IP address, taking FIG. 6C as an example, it can be address 1-1/2-1/3-1

The first related information above is obtained by the second node through steps 2a-2-2 above.

In the description of the above embodiment, it is assumed that the first node migrates, but in an actual system, it may also be used when the first node does not migrate but the configuration is updated. In this way, the above first node and second node are nodes in the non-migration process. For example, the first node is the relay node, and the second node is the donor node or the central unit of the donor node, or the control plane part of the central unit of the donor node, or the user plane part of the central unit of the donor node.

Third Aspect: Data Packet Transmission

In the third aspect of the disclosure, the first node will be configured to transmit cached data packets according to the configuration before the configuration update or before the migration. However, in actual systems, these cached data packets are limited. After these cached data packets are transmitted, the configuration (the old configuration) before the configuration update or before the migration does not need to be retained. The "indication information for indicating to retain the configuration" contained in step 2-1 of the above second aspect provides a method for releasing the old configuration, that is, releasing the configuration by transmitting the first data configuration message.

On the premise of guaranteeing the transmission of the data packet, in order to release the old configuration, the third aspect according to the disclosure also provides other optional methods. The node involved in this method is the third node (for example, may be the migrated node, or the parent node directly connected to the migrated node, or the parent node indirectly connected to the migrated node) and the fourth node (for example, the child node directly connected to the migrated node, or the child node indirectly connected to the migrated node), there may be other nodes between the third node and the fourth node, that is, the third node and the fourth node may communicate through other nodes. The third node also caches the data packets transmitted to the fourth node. When the third node migrates, in order to allow the fourth node to release the old configuration in time, the third aspect of the disclosure provides a communication method, which may be executed by a third node, and the method may include:

transmitting a fourth message, wherein the fourth message is used to indicate the timing of updating and/or releasing configuration by the fourth node, and/or indicate the status of the data packet transmitted to the fourth node.

Correspondingly, with the fourth node as the execution subject, the method may include: receiving a fourth indication information message transmitted by the third node, the fourth indication information message is used to indicate the configuration update timing or configuration release timing of the fourth node, and/or indicate the status of the data packet transmitted to the fourth node.

That is, the third node transmits the fourth message for informing the fourth node when the new configuration may be used (that is, the configuration corresponding to the migrated node), and/or informing the fourth node when the old configuration may be released (that is, corresponding to the node configuration used before the migration), the message may be directly transmitted by the third node to the fourth node, or the message may be transmitted to the fourth node via other nodes. Wherein, the specific form of the fourth message is not limited in the embodiments of the disclosure, for example, the indication information may be carried in the data packet (for example, in a BAP header), or the information may be a predefined information form.

Wherein, alternatively, the above third node is the migrated relay node, the child node of the migrated node, or the parent node of the migrated node, and the fourth node is the target receiving node of the user data packet corresponding to the third node.

Alternatively, the above fourth message may be a data packet, and the data packet may include at least one of the following:

indication information for indicating whether the data packet is the last data packet to indicate the fourth node to update and/or release configuration, and/or to indicate the status of the data packet transmitted to the fourth node;

indication information for indicating whether the data packet is the first data packet to indicate the fourth node to update and/or release configuration, and/or to indicate the status of the data packet transmitted to the fourth node;

indication information of the transmission configuration information corresponding to the data packet to indicate to transmit the data packet to the fourth node according to the transmission configuration information.

Alternatively, the above last data packet may be the last data packet transmitted using the old configuration, and the above first data packet may be the first data packet transmitted using the new configuration.

The following explains the communication method in conjunction with the optional embodiment of the third aspect of the disclosure. Similarly, the optional embodiment below should not be understood as a limitation on the implementation of the method, but a continuous implementation of the method.

Figure 7:
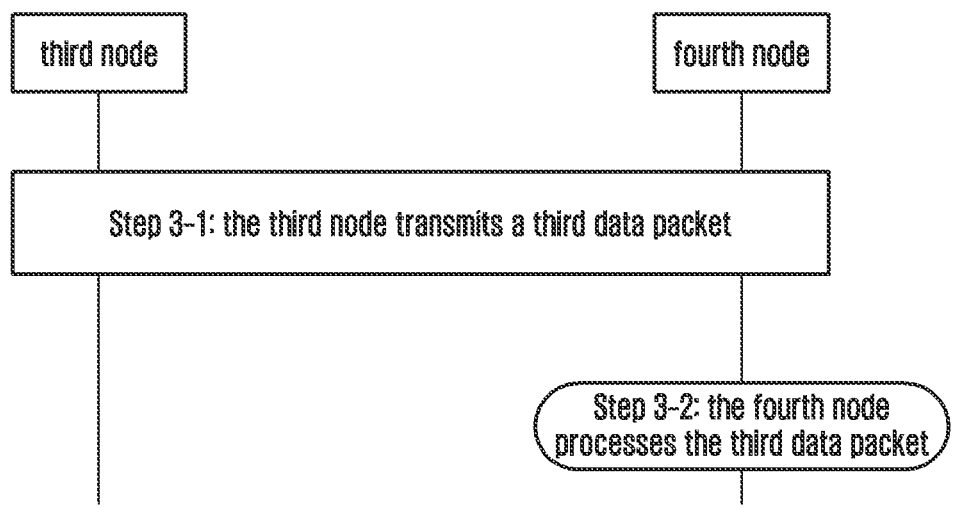
FIG. 7 is an example of a flowchart of a communication method according to a third aspect according to an embodiment of the disclosure.

FIG. 7 is an example of a flowchart of a communication method according to a third aspect according to an embodiment of the disclosure.

As an optional solution, referring to FIG. 7, the communication method provided in this aspect may include the following step 3-1 and step 3-2:

Step 3-1: the third node transmits a third data packet, the target receiving node of the data packet is the fourth node, and the node receiving the first data packet may be the fourth node, or other nodes between the third node and the fourth node. Alternatively, the data packet contains at least one of the following information:

indication information of the last packet (that is, an optional method of the above fourth message), the function of the information is to indicate whether the data packet is the last data packet transmitted to the fourth node (or the last cached data packet, or the last packet received under the old configuration, or the last packet transmitted by using the old configuration)

indication information of the first packet (an optional method of the above fourth message), the function of the information is to indicate whether the data packet is the first data packet transmitted to the fourth node (or the first data packet transmitted by using the new configuration)

indication information of the transmission configuration used, which informs the receiving node of the third data packet of the configuration information used when transmitting the data packet (may be the fourth node, or may be the transmission node between the third node and the fourth node), for example, indicating to use the old configuration information, or indicating to use the new configuration information.

Wherein, the above old configuration (old configuration information), or the new configuration (new configuration information), or specific information of the transmission configuration may include at least one of the following information:

information contained in the data packet information related to routing (that is, information related to the transmission routing corresponding to the data packet)

information related to data mapping (may refer to the description of the corresponding information in the preceding text)

Alternatively, the specific content of the above configuration may refer to the definition/description in above step 2-1

Step 3-2: the fourth node processes the third data packet transmitted by the third node.

In an example, if the indication information contained in the third data packet indicates that the data packet is not the last data packet transmitted to the fourth node (or the last cached data packet, or the last data packet received under the old configuration, or the last data packet transmitted by using the old configuration) or the first data packet (or the first data packet transmitted by using the new configuration), then the fourth node continues to receive the data packet by using the old configuration.

In another example, if the indication information contained in the third data packet indicates that the data packet is the last data packet transmitted to the fourth node (or the last cached data packet, or the last data packet received under the old configuration, or the last data packet transmitted by using the old configuration) or the first data packet (or the first data packet transmitted by using the new configuration), then the fourth node releases the old configuration (that is, it will no longer be used in the future), and uses the new configuration to transmit the data packet.

Wherein, if the above third data packet is the first data packet transmitted by using the new configuration, the fourth node may still use the old configuration to receive the first data packet. After receiving the data packet, the fourth node may use the new configuration and release the old configuration.

Alternatively, when there are one or more other nodes (such as the tenth node) between the third node and the fourth node, the third data packet transmitted in the above step 3-1 will be transmitted to the tenth node, at this time, the communication method further includes the following steps:

Step 3-1a: the tenth node receives the third data packet transmitted by the third node. In an example, if the indication information contained in the third data packet indicates that the data packet is not the last data packet transmitted to the fourth node (or the last cached packet, or the last packet received under the old configuration, or the last packet transmitted by using the old configuration) or the first packet (or the first data packet transmitted by using the new configuration), then the tenth node continues to use the old configuration to receive and/or transmit the data packet. In another example, if the indication information contained in the third data packet indicates that the data packet is the last data packet transmitted to the fourth node (or the last cached data packet, or the last data packet received under the old configuration, or the last data packet transmitted by using the old configuration) or the first data packet (or the first data packet transmitted by using the new configuration), then the tenth node transmits the data packet at last (that is, the last transmission of the data packet of all the packets transmitted to the fourth node), and further, after transmitting the third data packet, the tenth node releases the old configuration and uses the new configuration to transmit the data packet. If there are multiple intermediate nodes between the third node and the fourth node (that is, the above tenth node), each intermediate node may perform the above step 3-1a.

That is, when the fourth node is the target receiving node of the third data packet, the fourth node may perform corresponding processing based on the fourth message carried in the third data packet, if the fourth node is not the target receiving node of the third data packet, the fourth node may perform corresponding processing based on the fourth message carried in the data packet, and continue to transmit the data packet to the target receiving node to transmit the data packet to the target receiving node so that the target receiving node may perform corresponding processing based on the information in the data packet (including the fourth message).

The above optional embodiments of the third aspect are described from the perspective of the fourth message transmitting node (that is, the third node). Similarly, when the corresponding solution is described from the receiving node (the fifth node), the communication methods may include:

receiving the fourth message transmitted by the third node, the fourth message is used to indicate the timing of updating and/or releasing configuration by the fourth node, and/or indicate the status of the data packet transmitted to the fourth node.

Alternatively, the fifth node is the fourth node, or the fifth node is another node on the transmission path between the third node and the fourth node.

Alternatively, if the fifth node is another node, the method further includes:

transmitting the fourth message to the fourth node.

Alternatively, the method may further include: performing at least one of the following based on the fourth message: transmission of the data packet; update of the configuration information (update of a new configuration, that is, using a new configuration); release of configuration information (that is release of an old configuration).

The third data packet in the above process in the optional embodiments of the third aspect of the disclosure may be a data packet containing a BAP header or other types of data packets. The "indication information of the last data packet" in the above third data packet may be included in the BAP header or in other fields of the data packet. In other words, when the fourth message is exchanged based on the form of a data packet, the specific position of the fourth message in the data packet (that is, the way the data packet carries the message) and the format of the data packet are not limited in the embodiment of the disclosure.

In the above description, it is assumed that there is a node migration, but in an actual system, if the migration does not occur, the above process may also be used at the third node, the fourth node, and the tenth node.

The optional embodiments provided in the third aspect of the disclosure may at least have the following technical effects:

The relay node (that is, the fourth node, or the node between the third node and the third node) may correctly receive the data packets transmitted to the node before the configuration is updated or before the migration, and may also release the old configuration in time to avoid the retransmission of data packets and save network resources.

Fourth Aspect: Configuring the User (That is, UE) Accessing the Relay Node

During the migration of the relay node, the donor node it accesses may change, which will cause the security configuration (such as the security key) of the user (that is, the user terminal UE) accessing the relay node to change. In traditional technology, once the central unit (the central unit of the donor node) to which the user is connected changes, all data packets that have not been transmitted to the user will be transmitted by using the new security configuration (such as a security key). However, in the relay network, since the relay node may still cache the data packets that use the old security configuration (before the relay node migrates), in order to allow the user to receive these data packets correctly (this may prevent the new donor node from retransmitting the data packets), the user needs to be configured so that the user may receive the data packets by using the correct security configuration. In order to achieve this objective, the above second aspect of the disclosure provides an optional method of delaying transmitting the RRC message to the user, and transmitting the "indication information for indicating to delay transmitting user configuration information" so that the second node may correctly receive the data packet. In addition to this optional method, the fourth aspect of the disclosure also provides other methods. In the following method, it is assumed that the donor node connected to the migrated node has migrated from one donor node (referred to as the source donor node) to another donor node (referred to as the target donor node). In this process, it is necessary to configure the users who access the migrated node.

For the above purpose, the fourth aspect of the disclosure provides a communication method, which may be executed by a sixth node, and the method includes:

transmitting a fifth message, the fifth message includes configuration information about the transmission and/or processing of the data packet by the user terminal accessing the seventh node, wherein the transmission configuration information includes the configuration information corresponding to the migrated relay node before the migration, and/or, the configuration information corresponding to the migrated relay node after the migration.

Alternatively, the seventh node includes at least one of the following: the migrated relay node; the relay node that corresponds to the same donor node as the migrated relay node;

Alternatively, the sixth node includes at least one of the following: the seventh node; the donor node; the central unit of the donor node; the control plane part of the central unit of the donor node; the user plane part of the central unit of the donor node; wherein, the donor node is the donor node corresponding to the migrated relay node before the migration or the donor node corresponding to the migrated relay node after the migration.

Alternatively, the seventh node may be a migrated donor node, that is, the donor node connected to the migrated relay node after the migration, and the sixth node may be the migrated relay node.

In an optional embodiment of the disclosure, the above fifth message may include at least one of the following:

configuration information corresponding to at least one radio bearer, the information may also be called first user configuration information;

information for informing the user terminal to convert the used configuration information. The message may also be called indication information of configuration conversion;

configuration information used by the user terminal may also be called third user configuration information.

In an optional embodiment of the disclosure, the communication method may further include:

transmitting a sixth message to the seventh node, the sixth message is used to request configuration information corresponding to the user terminal accessing the seventh node;

receiving a response message of the sixth message, the response message includes configuration information about the transmission and/or processing of the data packet by the user terminal accessing the seventh node.

The solution provided by the fourth aspect of the disclosure will be described below in conjunction with several optional implementation solutions.

Implementation solution 1: Data packets based on the old configuration and data packets based on the new configuration are transmitted by using different DRB (Data Radio Bearer) and/or LCID (Logical Channel ID, logical channel identification information). As an optional solution, the method may include the following process, as shown in FIG. 8:

Step 4-1-1: the sixth node transmits the first user configuration message (an optional solution of the fifth message) to the user (i.e., the user terminal). The user terminal is a terminal accessing the sixth node, and the user terminal may be an ordinary terminal that does not have a relay function may, or may also be a relay node with a relay function (that is, a child node of the first node). In an embodiment, the message may be transmitted by the sixth node to the user via one or more intermediate nodes. In another embodiment, the message may be transmitted by the sixth node to the seventh node, and then the message is transmitted by the seventh node to the user (for example, node N transmits it directly to the user, or node N transmits it to the user via one or more intermediate nodes). The function of the configuration message is to configure the user's reception of data (i.e., the data packet). These data may adopt the old security configuration (the security configuration adopted before the migration of the relay node that the user accesses), or it may adopt a new security configuration (the security configuration adopted after the migration of the relay node that the user accesses). The message may include the configuration of one or more radio bearers. For one radio bearer, the message includes at least one of the following information:
  identification information of the radio bearer
  configuration information of the radio bearer. The configuration includes at least one of the following information:
    PDCP configuration
    RLC configuration
    logical channel configuration
    indication information of the first configuration type, which is used to indicate whether the configuration information is the old configuration (such as the old security configuration, or the configuration used before the migration of the first node) or the new configuration (such as the new security configuration, the configuration used after the migration of the first node)
    indication information of the first user data, the indication information is used to indicate whether the user data served by the configuration is the data packet which adopts the old configuration (such as the old security configuration, or the configuration used before the migration of the first node), or the data packet which adopts the new configuration (such as new security configuration, the configuration used after the migration of the first node)
  For the above PDCP configuration, RLC configuration, and logical channel configuration, please refer to TS38.331 first configuration information of the radio bearer. In an embodiment, the first configuration information is used to serve the data packet adopting the old configuration, and the configuration information includes at least one of the following information:
  PDCP configuration
  RLC (Radio Link Control, radio link control layer protocol) configuration
  Logical channel configuration
  For the above PDCP configuration, RLC configuration, logical channel configuration, please refer to the description in the communication standard TS38.331 second configuration information of the radio bearer. In an embodiment, the first configuration information is used to serve the data packet adopting a new configuration, and the configuration information includes at least one of the following information:
  PDCP configuration
  RLC configuration
  Logical channel configuration
  For the above PDCP configuration, RLC configuration, and logical channel configuration, please refer to TS38.331 configuration information of the logical channel. The configuration information includes at least the identifier of the logical channel. For other configurations, please refer to the LogicalChannelConfig in TS38.331 in the table. In addition, the configuration information may also include at least one of the following information:
    indication information of the second configuration type, which is used to indicate whether the configuration information is the old configuration (such as the old security configuration, or the configuration used before the migration of the first node) or the new configuration (such as the new security configuration, the configuration used after the migration of the first node)
    indication information of the second user data, the indication information is used to indicate whether the user data served by the configuration is the data packet adopting the old configuration (such as the old security configuration, or the configuration used before the migration of the first node), or the data packet adopting the new configuration (such as new security configuration, the configuration used after the migration of the first node)
  configuration information of the first logical channel. The configuration information includes at least the identifier of the logical channel. For other configurations, please refer to the LogicalChannelConfig in TS38.331. In an embodiment, after the user receives the data packet from the first logical channel, the old configuration (such as the old security configuration or the configuration used before the migration of the first node) is used to process the data packet
  configuration information of the second logical channel. The configuration information includes at least the identifier of the logical channel. For other configurations, please refer to the LogicalChannelConfig in TS38.331. In an embodiment, after the user receives the data packet from the second logical channel, a new configuration (such as a new security configuration or the configuration used after the migration of the first node) is used to process the data packet.

In the optional implementation solution provided by the fourth aspect of the disclosure, the fifth message may include configuration information used by the user terminal to receive the data packet (that is, the function of the information is to inform the user how to receive data), or it may include the configuration information for the user to process the data packet after receiving the data packet (the function of the information is to inform the user how to process the data. For example, the configuration information may be the new security key information used by the user terminal after the node migrates in the network. Then the user may use the security key to process the received data packet).

Figure 8:
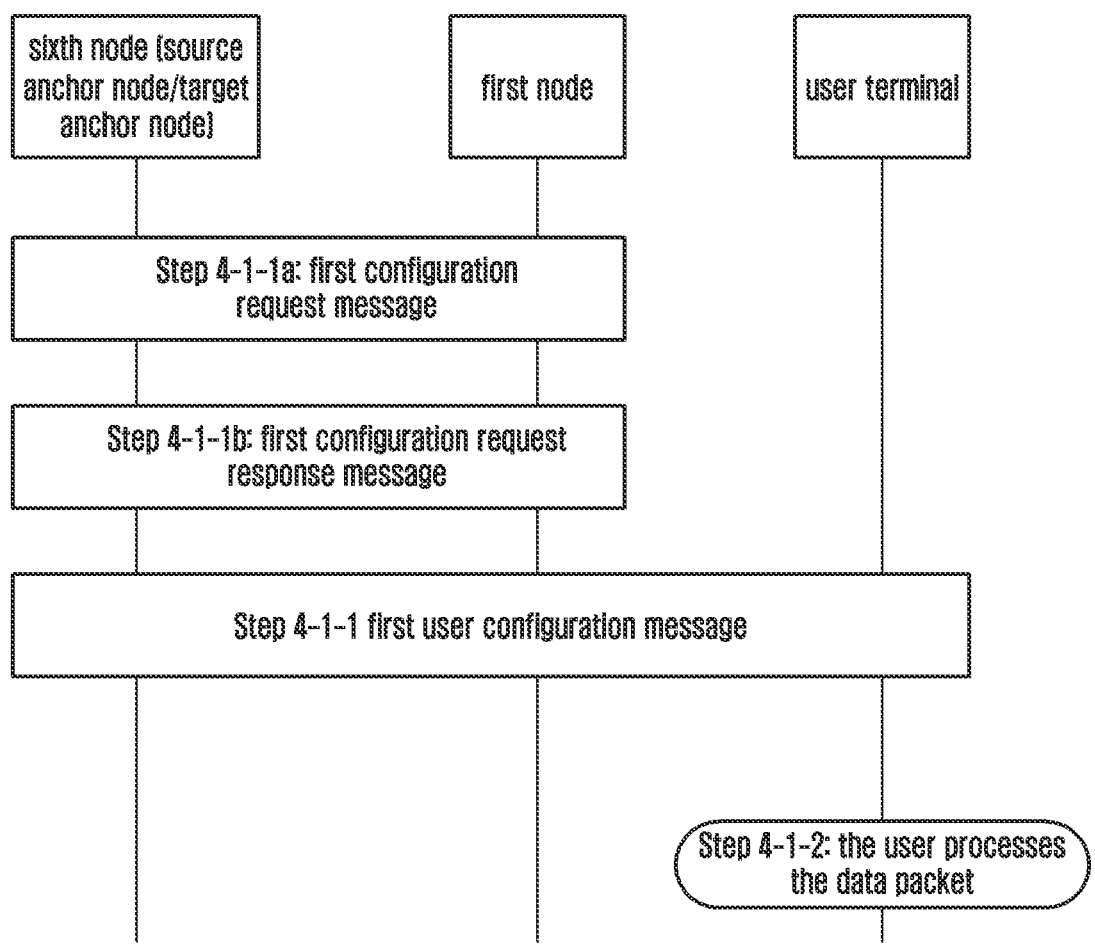
FIG. 8 is example 1 of a flowchart of a communication method according to a fourth aspect according to an embodiment of the disclosure.

FIG. 8 is example 1 of a flowchart of a communication method according to a fourth aspect according to an embodiment of the disclosure.

Taking the user terminal as the execution subject, the above optional embodiment may further include step 4-1-2 as shown in FIG. 8: the user processes the data packet. In this step, the user terminal may determine the configuration used to process the data packet and/or the configuration used to receive the data packet according to the configuration information in step 4-1-1.

In addition, in order to configure the user, the above implementation solution 1 may also include an interaction process between the target donor node/source donor node and the first node. Alternatively, the interaction process may include:

Step 4-1-1a: the sixth node (it may be the target donor node/source donor node, or the central unit of the donor node, the control plane part of the central unit, or the user plane part of the donor node, corresponding the sixth node in FIG. 8 (source donor node/target donor node), it transmits a first configuration request message (sixth message) to the first node. The function of the request message is to configure the user accessing to the first node (such as a migrated relay node), for a user, the configuration request message includes at least one of the following information:
    identification information of the user
    configuration information of the user's radio bearer. For a
        radio bearer, the information includes at least one of the following information:
        identification information of the radio bearer
        information related to the tunnel at the target donor node/source donor node, the information includes at least one of the following information:
        address information, such as IP address
        identification information of the tunnel, such as tunnel endpoint ID
        indication information for indicating to retain the old configuration. The information indicates whether to retain the old configuration (the configuration before the migration of the first node), such as "retain" or "not retain". If the indication information indicates "retain", it manifests the first node will also transmit data on the old tunnel (the old tunnel is the tunnel established between the first node before migration and the source donor node)

Step 4-1-1b: the first node transmits a first configuration request response message (that is, the response information of the sixth message) to the target donor node/source donor node. The function of the response message is to generate the user's configuration based on the configuration in step 4-1-1a, the message includes at least one of the following information:
    identification information of the radio bearer
    configuration information of the radio bearer
    first configuration information of the radio bearer
    second configuration information of the radio bearer
    configuration information of logical channel
    configuration information of the first logical channel
    configuration information of the second logical channel For the specific content of the above configuration information, please refer to the definition/description in the above step 4-1-1.

Alternatively, the above step 4-1-1a and step 4-1-1b may occur before step 4-1-1.

Alternatively, when the implementation solution includes step 4-1-1a and step 4-1-1b, the fifth message may be obtained by the target donor node/source donor node based on the above sixth information, for example, the target donor node/source donor extract part or all of the information in the above response message to form a fifth message, and then transmit to the user terminal. In other words, the above fifth message transmitted to the user terminal may be generated by the target donor node/source donor node, or the fifth message may be generated by the target donor node/source donor node based on the sixth message transmitted to the target donor node/source donor node by the relay node that the user terminal accesses. Alternatively, when the target donor node/source donor node transmits the fifth message to the user terminal, the target donor node/source donor node may transmit it directly to the user terminal or transmit it to the user terminal through the relay node of the user terminal.

In the above process, the first user configuration message may be an RRC message, such as an RRCReconfiguration message, or other types of messages; the first configuration request message and the first configuration request response message may be UE Context Setup/Modification Request and UE Context Setup/Modification Response message, respectively, or may also be other types of messages.

The beneficial effects of the above implementation solution 1 process may at least include:

1. The user may determine the configuration used to process user data. For example, for the data packet received before the migration of the first node, the user will use the old configuration for processing, and for the data packet received after the migration of the first node, the user will use the new configuration for processing. This process may ensure that the user correctly process the data the user receives.

2. The user may use both the old configuration and the new configuration to process data at the same time, meanwhile the network side may also use the old configuration and the new configuration at the same time to transmit data to the user, which improves the efficiency of data transmission.

Figure 9:
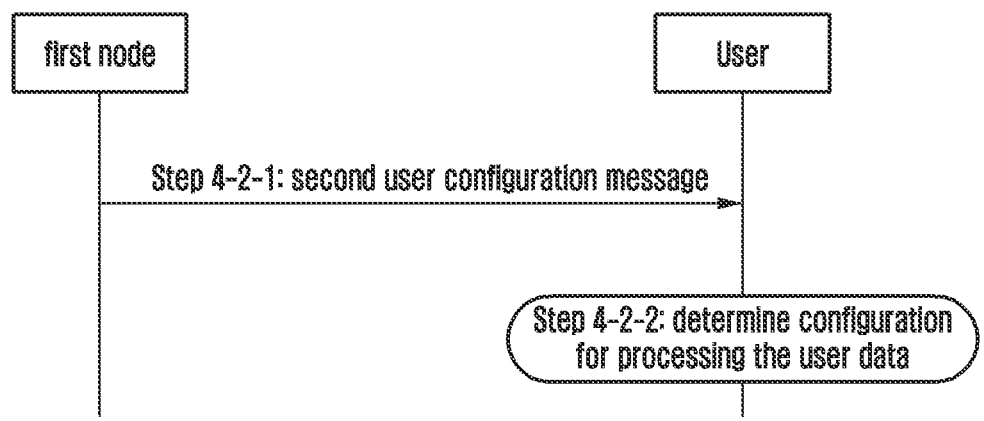
FIG. 9 is example 2 of a flowchart of a communication method according to a fourth aspect according to an embodiment of the disclosure.

FIG. 9 is example 2 of a flowchart of a communication method according to a fourth aspect according to an embodiment of the disclosure.

The optional implementation solution 2 of the fourth aspect of the disclosure: transmitting the indication information for configuration conversion to the user through the fifth message. Alternatively, referring to FIG. 9, the process of the method may include:

Step 4-2-1: the first node (which may be a migrated relay node) transmits a second user configuration message to the user. The function of the message is to indicate the configuration information used by the user to process data. The message includes at least one of the following information:
    configuration indication information. The function of the information is to inform the user of the configuration used for conversion. For example, if the user is indicated to adopt a new configuration (such as a new security configuration, the configuration used after the migration of the first node), then the user adopts the old configuration to process the received data packet before receiving the indication information
    configuration information used to process user data, which includes at least one of the following information:
    PDCP configuration
    RLC configuration
    Logical channel configuration
    Wherein, the above PDCP configuration, RLC configuration, and logical channel configuration may refer to the corresponding description in the standard TS38.331.

Step 4-2-2: The user (that is, the user terminal) determines the configuration used to process user data according to the information in step 4-2-1.

Wherein, in the process of implementation solution 2, the second user configuration message may be transmitted to the user through the MAC CE, or may also be transmitted to the user through the RLC header, or may be transmitted to the user through other forms.

Figure 10:
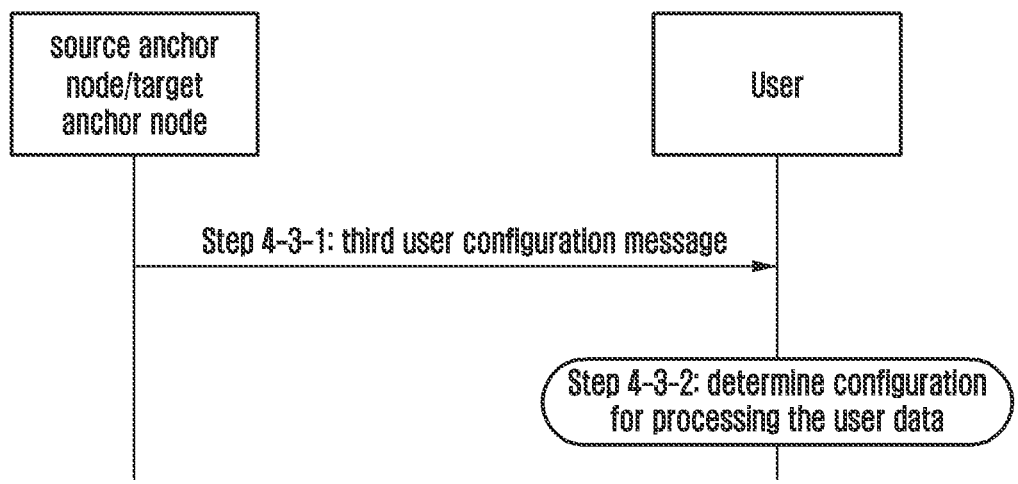
FIG. 10 is example 3 of a flowchart of a communication method according to a fourth aspect according to an embodiment of the disclosure.

FIG. 10 is example 3 of a flowchart of a communication method according to a fourth aspect according to an embodiment of the disclosure.

Implementation solution 3: the source donor node or the target donor node transmits configuration information to the user. Alternatively, referring to FIG. 10, the method 3 may include the following steps.

Step 4-3-1: the source donor node or the target donor node transmits a third user configuration message to the user. The function of this message is to indicate the configuration information used for the user to process data. The message includes at least one of the following information:

configuration indication information. The function of the information is to inform the user of the configuration used for conversion. If the user is indicated to adopt a new configuration (such as a new security configuration, the configuration used after the migration of the first node), then the user uses the old configuration to process the received data packet before receiving the indication information configuration information used to process user data, which includes at least one of the following information:
        PDCP configuration
        RLC configuration
        Logical channel configuration For the above PDCP configuration, RLC configuration, and logical channel configuration, please refer to TS38.331

Step 4-3-2: The user determines the configuration used to process user data based on the information in step 4-3-1

Wherein, in the process of the above implementation solution 3, the third user configuration message may be an RRC message (for example, an RRCReconfiguration message), or may be other type of messages.

The above implementation solutions 2 and implementation solution 3 have at least the following beneficial effects:

The user can determine the configuration for processing user data according to the received configuration information, so as to ensure the correct reception of user data.

Based on the optional embodiments provided in the first, second, third, and fourth aspects of the disclosure, the communication method provided in the disclosure may at least have the following effects:

A. Based on the disclosure content of the first aspect, the beneficial effects include:

1. The relay node (the first node) may determine whether the data packet needs to be cached according to the configuration message (the first configuration message);

2. The relay node (the first node) may determine the data packet that needs to be transmitted according to the configuration message (the first configuration message). For example, the first node may transmit the data packet that the second node has not received.

3. The donor node (second node) may determine the data packets cached at the relay node (the first node), thereby knowing that only the data packet cached at the relay node may be transmitted.

B. Based on the disclosure content of the first aspect, the beneficial effects include: the relay node may determine the method for transmitting the data packets received before the configuration is updated or before the migration, and transmit these data packets to the target node.

C. Based on the disclosure content of the first aspect, the beneficial effects include: the relay node may correctly receive the data packet transmitted to the node before the configuration is updated or before the migration, and may also release the old configuration in time, thereby avoiding the retransmission of the data packets and can save network resources.

Based on the disclosure content of the fourth aspect, the beneficial effects include: the user may determine the configuration used to process the user data, thereby ensuring that the user correctly receives the user data during the relay node migration process.

Based on the same principle as the method provided in the first aspect of the embodiments of the disclosure, the embodiments of the disclosure also provide a communication apparatus, wherein the communication apparatus may be a constituent part of the first node, the apparatus includes a communication module, and the communication module is configured to: receive a first message transmitted by a second node, the first message is used to configure transmission and/or storage of the user data packet by the first node.

Alternatively, the first message includes at least one of the following: first information, which is used to indicate whether to transmit fourth information, wherein the fourth information is used to indicate a data packet delivery status; second information, which is used to indicate whether to cache the data packet; third information, which is used to indicate information related to a transmission address corresponding to the data packet; fourth information, which is used to indicate the data packet delivery status; seventh information, which is used to indicate a node migration event notification information.

Alternatively, the above communication module is further configured to: configure the transmission and/or storage of the user data packet according to the first message;

Wherein, the communication module configures the transmission and/or storage of the user data packet according to the first message, and may be configured to perform at least one of the following:

determine whether the data packet needs to be cached according to at least one of the first information, the second information, the fourth information, and the seventh information;

determine the information related to a transmission address for transmitting the data packet according to the third information;

determine the data packet that needs to be transmitted, and/or a transmission method of the data packet according to the fourth information.

Alternatively, the information related to a transmission address corresponding to the data packet includes at least one of the following information used by the first node and/or the second node to transmit the data packet:

BAP address information, IP address information, tunnel identification information.

Alternatively, the above fourth information includes at least one of the following:

transmission expectation information of the second node for the data packet; information related to at least one first data packet, wherein the first data packet includes at least one of the following: a lost data packet; a data packet successfully transmitted; a retransmission data packet successfully transmitted; a data packet unsuccessful transmitted; a retransmission data packet unsuccessful transmitted.

Alternatively, the expected transmission information includes at least one of the following: expected cache size; expected transmission rate.

Alternatively, the information related to the at least one first data packet includes at least one of the following:
  data packet identification information of at least one first data packet;
  number information of the first data packets continuously transmitted;
  delivery status indication information of the at least first data packet.

Alternatively, the data packet identification information of the at least one first data packet includes at least one of the following:
  identification information of the last transmitted data packet in the first data packets;
  identification information of the first transmitted data packet in the first data packets;
  identification information of the first transmitted data packet in the first data packets continuously transmitted;
  identification information of the last transmitted data packet in the first data packets continuously transmitted;
  delivery status indication information of at least one first data packet includes:
  bitmap information of whether the first data packet is lost or received successfully.

Alternatively, the above communication apparatus may also be configured to:
  transmit a second message, wherein the second message is used to inform the second node of information related to the transmission and/or storage of the user data packet by the first node; the second message is a response message for the first message, or, the first message is response information for the second message.

Alternatively, the second message includes at least one of the following:
  fifth information, which is used to inform the second node whether the fourth information needs to be transmitted, and the fourth information is used to indicate the data packet delivery status;
  information related to at least one second data packet, wherein the second data packet includes at least one of the following:
  a data packet that the first node needs to transmit to the second node; a data packet cached by the first node; a data packet received by the first node; a retransmission data packet.

Alternatively, the information related to at least one second data packet includes at least one of the following:
  at least one data packet that the first node needs to transmit to the second node;
  data packet identification information of at least one second data packet;
  indication information of the data packet identification information of at least one second data packet;
  number information of the second data packet;
  information indicating for indicating whether at least one second data packet is cached;
  indication information for indicating whether at least one second data packet is a retransmission data packet.

The embodiment of the disclosure also provides a communication apparatus, which may be implemented as a constituent part of the second node, wherein the communication apparatus includes a communication module, and the communication module may be configured to transmit a first message, wherein the first message is used to configure transmission and/or storage of a user data packet by a first node.

Alternatively, the above communication module may also be configured to receive a second message transmitted by the first node, wherein the second message is used to inform the second node of the transmission and/or storage of the user data packet by the first node, wherein, the first message is a response message of the second message, or the second message is a response message for the first message.

Alternatively, the above communication module may also be configured to perform at least one of the following:
  determining the first message based on the second message;
  transmitting information for configuring the transmission and/or storage of the user data packet by the first node to the first data based on the second message.

The embodiment of the disclosure also provides a communication apparatus, which may be implemented as a constituent part of the first node, wherein the communication apparatus includes a communication module, and the communication module may be configured to receive a third message, wherein the third message is used to configure the transmission of the user data packet corresponding to the first node; and transmitting the user data packet according to the third message.

Alternatively, the user data packet corresponding to the first node includes a user data packet corresponding to the first node before a node migration occurs, or a corresponding user data packet corresponding to the first node before node configuration information is updated.

Alternatively, the third message includes at least one of the following:
  first indication information, which is used to indicate a third data packet, wherein the third data packet includes at least one of: a data packet that needs to be transmitted and a data packet that does not need to be transmitted;
  first configuration information, which is used to indicate a transmission configuration of the data packet to be transmitted;
  second indication information, which is used to indicate the information contained in the data packet to be transmitted;
  information related to the configuration information of a user terminal accessing the first node.

Alternatively, the information related to the configuration information of the user terminal accessing the first node includes at least one of the following: configuration information of the user terminal; third indication information, which is used to indicate a configuration timing of the configuration information of the user terminal.

Alternatively, the above communication module may also be configured to: transmit a response message of the third message.

The embodiment of the disclosure also provides a communication apparatus, which may be implemented as a constituent part of the second node, wherein the communication apparatus includes a communication module, and the communication module is configured to: transmit a third message, wherein the third message is used to configure a transmission of a user data packet corresponding to the first node.

Alternatively, the above communication module may be further configured to receive a response message of the third message.

An embodiment of the disclosure also provides a communication apparatus, which may be implemented as a constituent part of a third node, wherein the communication apparatus includes a communication module, and the communication module is configured to:

transmit a fourth message, wherein the fourth message indicates timing of updating and/or releasing configuration by a fourth node.

Alternatively, the fourth message is a data packet, and the data packet contains at least one of the following:

indication information for indicating whether the data packet is the last data packet to indicate the fourth node to update and/or release configuration;

indication information for indicating whether the data packet is the first data packet to indicate the fourth node to update and/or release configuration;

indication information of transmission configuration information corresponding to the data packet, which is used to indicate to transmit the data packet to the fourth node according to the transmission configuration information.

Alternatively, the third node is a migrated relay node, and the fourth node is a target receiving node of a user data packet corresponding to the third node.

The embodiments of the disclosure also provide a communication apparatus, which may be implemented as a constituent part of a fourth node, wherein the communication apparatus includes a communication module, and the communication module is configured to:

receive a fourth message transmitted by a third node, wherein the fourth message is used to indicate timing of updating and/or releasing configuration by the fourth node.

Alternatively, the third node is a migrated relay node, and the fourth node is a target receiving node of a user data packet corresponding to the third node.

Alternatively, the above communication module may also be configured to perform at least one of the following based on the fourth message: transmission of data packets; update of configuration information; release of configuration information.

An embodiment of the disclosure also provides a communication apparatus, which may be implemented as a constituent part of a sixth node, wherein the communication apparatus includes a communication module, and the communication module is configured to:

transmit a fifth message, the fifth message includes configuration information about transmitting and/or processing of a data packet by a user terminal accessing a seventh node, wherein the transmission configuration information includes configuration information corresponding to the migrated relay node before the migration, and/or configuration information corresponding to the migrated relay node after the migration.

Alternatively, the fifth message includes at least one of the following:

configuration information corresponding to at least one radio bearer;

information for informing the user terminal to convert the used configuration information;

configuration information used by the user terminal.

Alternatively, the above communication module may also be configured to:

transmit a sixth message to the seventh node, wherein the sixth message is used to request configuration information corresponding to the user terminal accessing the seventh node;

receive a response message of the sixth message, wherein the response message includes configuration information about the transmission and/or processing of the data packet by the user terminal accessing the seventh node.

The embodiment of the disclosure also provides a communication apparatus, which may be implemented as a constituent part of a user terminal, wherein the communication apparatus includes a communication module, and the communication module is configured to:

receive a fifth message, wherein the fifth message includes configuration information about transmitting and/or processing of the data packet by the user terminal accessing the seventh node, wherein the transmission configuration information include configuration information corresponding to the migrated relay node before the migration, and/or, configuration information corresponding to the migrated relay node after the migration; transmit and/or process the data packet based on the fifth message.

It is understandable that the communication apparatus provided in the embodiment of the disclosure is an apparatus corresponding to the method provided in the disclosure. For the description of the related steps or terms in the apparatus, please refer to the corresponding explanation in the above method part.

Figure 11:
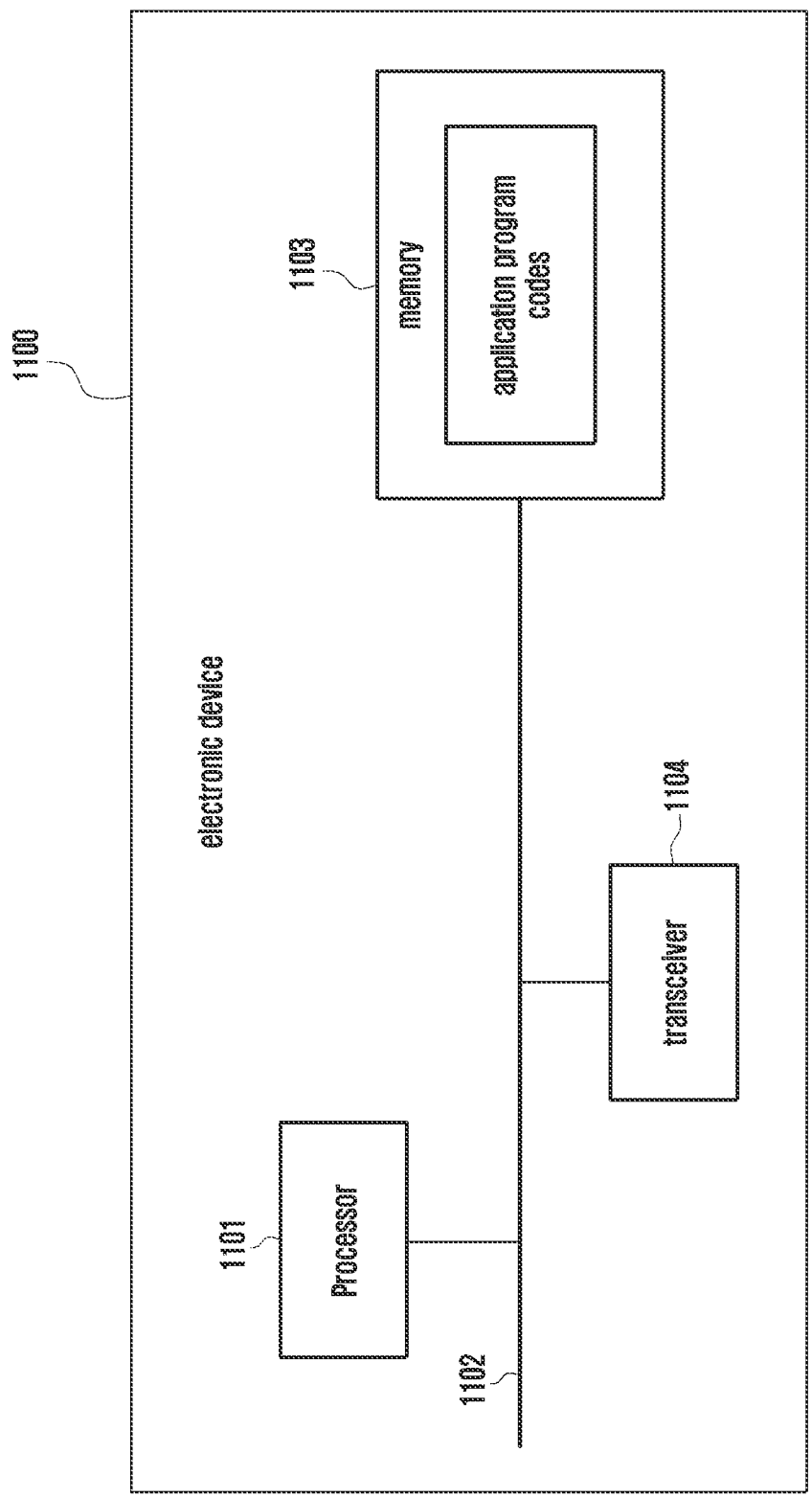
FIG. 11 is a schematic structural diagram of an electronic device according to an embodiment of the disclosure.

FIG. 11 is a schematic structural diagram of an electronic device provided by according to an embodiment of the disclosure.

In an optional embodiment, an electronic device is provided. As shown in FIG. 11, the electronic device 1100 referring to FIG. 11 includes a processor 1101 and a memory 1103. Wherein, the processor 1101 and the memory 1103 are connected, for example, through a bus 1102. Alternatively, the electronic device 1100 may further include a transceiver 1104, and the transceiver 1104 may be used for data interaction between the electronic device and other electronic devices, such as data transmission and/or data reception. It should be noted that in actual applications, the number of the transceiver 1104 is not limited to one, and the structure of the electronic device 1100 does not constitute a limitation to the embodiment of the disclosure.

The processor 1101 may be a CPU (Central Processing Unit), a general-purpose processor, a DSP (Digital Signal Processor), an ASIC (Application Specific Integrated Circuit), an FPGA (Field Programmable Gate Array) or other programmable logic devices, transistor logic devices, hardware components or any combination thereof. It may implement or execute various logical blocks, modules, and circuits described in conjunction with the disclosure of the disclosure. The processor 1101 may also be a combination for realizing computing functions, for example, containing a combination of one or more microprocessors, a combination of a DSP and a microprocessor, and the like.

The bus 1102 may include a path for transferring information between the above components. The bus 1102 may be a PCI (Peripheral Component Interconnect) bus or an EISA (Extended Industry Standard Architecture) bus or the like. The bus 1102 may be divided into an address bus, a data bus, a control bus, and the like. For ease of presentation, only one thick line is used to represent in FIG. 11, but it does not mean that there is only one bus or one type of bus.

The memory 1103 may be an ROM (Read Only Memory) or other types of static storage devices that may store static information and instructions, an RAM (Random Access Memory) or other types of dynamic storage device that may store information and instructions, or may also be EEPROM (Electrically Erasable Read Only Memory), a CD-ROM (Compact Disc Read Only Memory) or other optical disk storage, optical disk storage (including compressed Optical discs, laser discs, optical discs, digital universal discs, Blu-ray discs, etc.), magnetic disk storage media or other magnetic storage devices, or any other medium that may be used to carry or store desired program codes in the form of instructions or data structures and may be accessed by a computer, but not limited to this.

The memory 1103 is used to store application program codes for executing the solutions of the disclosure, and is controlled by the processor 1101 to execute. The processor 1101 is configured to execute the application program codes stored in the memory 1103 to implement the content shown in the above method embodiments.

The embodiment of the disclosure provides a computer-readable storage medium with computer programs stored on the computer-readable storage medium, and when the computer programs operate on a computer, the computer may execute the corresponding content in the above method embodiment.

It should be understood that, although the various steps in the flowchart of the drawings are displayed in order as indicated by the arrows, these steps are not necessarily performed in sequence in the order indicated by the arrows. Unless explicitly stated here, the execution of these steps is not strictly limited in order, and these steps may be executed in other orders. Moreover, at least part of these steps in the flowchart of the drawings may include multiple sub-steps or multiple stages. These sub-steps or stages are not necessarily executed at the same time, but may be executed at different times, and the execution order is not necessarily performed in sequence, but may be performed alternately or alternately with at least a part of other steps or sub-steps or stages of other steps.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A communication method executed by a first integrated access and backhaul (IAB) node, the communication method comprising:
   receiving, from a second IAB node, a message including an indication indicating withhold transmission indication information and a first radio resource control (RRC) message for a third IAB node;
   identifying whether a condition for a transmission of the first RRC message is met; and
   transmitting, to the third IAB node, the first RRC message for the third IAB node, in case that the condition for the transmission of the first RRC message is met,
   wherein the first IAB node belongs to a descendant node of a migrating IAB node,
   wherein the second IAB node is a IAB donor node, and
   wherein the third IAB node is a descendant node of the first IAB node.

2. The method according to claim 1, wherein the condition for the transmission of the RRC message includes that the first IAB node receives a second RRC message including information related to a migration.

3. The method according to claim 2, wherein the information related to the migration include new internet protocol (IP) address, routing identification (ID), and backhaul radio link control (RLC) channel ID.

4. The method according to claim 1, wherein the message includes a UE CONTEXT MODIFICATION REQUEST message.

5. A first integrated access and backhaul (IAB) node in a wireless communication system supporting an IAB, the first IAB node comprising:
   a transceiver configured to transmit and receive a signal; and
   a processor coupled to the transceiver, wherein the processor is configured to:
      receive, from a second IAB node, a message including an indication indicating withhold transmission indication information and a first RRC message for a third IAB node,
      identify whether a condition for a transmission of the first RRC message is met, and
      transmit, to the third IAB node, the first RRC message for the third IAB node, in case that the condition for the transmission of the RRC message is met,
   wherein the first IAB node belongs to a descendant node of a migrating IAB node,
   wherein the second IAB node is a IAB donor node, and
   wherein the third IAB node is a descendant node of the first IAB node.

6. The first IAB node of claim 5, wherein the condition for the transmission of the RRC message includes that the first IAB node receives a second RRC message including information related to a migration.

7. The first IAB node of claim 6,
   wherein the information related to the migration include new internet protocol (IP) address, routing identification (ID), and backhaul radio link control (RLC) channel ID.

8. The first IAB node of claim 5,
   wherein the fourth message includes a UE CONTEXT MODIFICATION REQUEST message indicates timing of updating and/or releasing configuration by a fourth node.

9. A communication method executed by a second integrated access and backhaul (IAB) node, the communication method comprising:
   generating a message including an indication indicating withhold transmission indication information and a first radio resource control (RRC) message for a third IAB node; and
   transmitting, to a first IAB node, the message, the first IAB node belonging to a descendant node of a migrating IAB node,
   wherein the RRC message for the third IAB node is transmitted from the first IAB node to the third IAB node, in case that a condition for the transmission of the RRC message is met,
   wherein the second IAB node is a IAB donor node, and
   wherein the third IAB node is a descendant node of the first IAB node.

10. The method according to claim 9,
    wherein the condition for the transmission of the RRC message includes that the first IAB node receives a second RRC message including information related to a migration.

11. The method according to claim 10, wherein the information related to the migration include new internet protocol (IP) address, routing identification (ID), and backhaul radio link control (RLC) channel ID.

12. The method according to claim 9, wherein the message includes a UE CONTEXT MODIFICATION REQUEST message.

13. A second integrated access and backhaul (IAB) node in a wireless communication system supporting an IAB, the second IAB node comprising:
- a transceiver configured to transmit and receive a signal; and
- a processor coupled to the transceiver, wherein the processor is configured to:
  - generate a message including an indication indicating withhold transmission indication information and a first radio resource control (RRC) message for a third IAB node, and
  - transmit, to a first IAB node, the message, the first IAB node belonging to a descendant node of a migrating IAB node,
- wherein the RRC message for the third IAB node is transmitted from the first IAB node to the third IAB node, in case that a condition for the transmission of the RRC message is met,
- wherein the second IAB node is a IAB donor node, and
- wherein the third IAB node is a descendant node of the first IAB node.

14. The second IAB node claim 13, wherein the condition for the transmission of the RRC message includes that the first IAB node receives a second RRC message including information related to a migration.

15. The second IAB node of claim 14, wherein the information related to the migration include new internet protocol (IP) address, routing identification (ID), and backhaul radio link control (RLC) channel ID.

* * * * *